US009811727B2

(12) United States Patent
Koh et al.

(10) Patent No.: US 9,811,727 B2
(45) Date of Patent: Nov. 7, 2017

(54) EXTRACTING READING ORDER TEXT AND SEMANTIC ENTITIES

(75) Inventors: Eunyee Koh, San Jose, CA (US); Walter Wei-Tuh Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1602 days.

(21) Appl. No.: 12/130,607

(22) Filed: May 30, 2008

(65) Prior Publication Data
US 2014/0301644 A1    Oct. 9, 2014

(51) Int. Cl.
G06F 17/00    (2006.01)
G06K 9/00    (2006.01)

(52) U.S. Cl.
CPC .............................. G06K 9/00469 (2013.01)

(58) Field of Classification Search
CPC .................................................... G06F 17/211
USPC ........................................................ 715/247
See application file for complete search history.

(56) References Cited

U.S. PATENT DOCUMENTS 5,832,530 A * 11/1998 Paknad et al. ................ 715/235
2006/0288278 A1* 12/2006 Kobayashi .................... 715/523

OTHER PUBLICATIONS

Altamura et al., 2000, "Transforming paper documents into XML format with Wisdom++", pp. 1-16.*
Tsuji et al., "Document Image Analysis for Generating Syntactic Structure Description," 1988.*
Nakajima et al., "Document Layout and Reading Sequence Analysis by Extended Split Detection Method," 1999.*
Liu et al., "Adaptive Document Segmentation and geometric Relation Labeling: Algorithms and Experimental Results," 1996.*
Liang, J., Phillips, I. and Haralick, R.M. An Optimization Methodology for Document Structure Extraction on Latin Character Documents IEEE Transactions on Pattern Analysis and Machine Intelligence, vol. 23, No. 7, pp. 719-734.
Meunier, J.L. Optimized XY-Cut for Determining a Page Reading Order IEEE Computer Society Proceedings of the 2005 Eight International Conference on Document Analysis and Recognition.
Ha, J., Haralick, R.M. and Phillips, I.T. Recursive X-Y Cut Using Bounding Boxes of Connected Components 1995, IEEE, pp. 952-955.

* cited by examiner

*Primary Examiner* — Shawn S Joseph
(74) *Attorney, Agent, or Firm* — Kilpatrick Townsend & Stockton LLP

(57) ABSTRACT

Methods and apparatus provide for an Extractor that receives a collection of strings and a bounding box(es) for each string. Each bounding box describes a position of at least a portion of a corresponding string in a source document. The source document includes multiple sections for presenting portions of the collection of strings in the source document. The Extractor arranges the collection of strings according to a reading order that corresponds to a language associated with the collection of strings. Upon arranging the collection of strings according to the reading order, the Extractor collects semantic entities from a target document that has the collection of strings ordered according to the reading order. For each collected semantic entity, the Extractor tags the collected semantic entity with a tag that describes a category of content that corresponds to a logical section of the target document from which the semantic entity was extracted.

17 Claims, 20 Drawing Sheets

Session 1: Personalization

Towards Task-based Personal Information Management Evaluations

David Elsweiler
Department Computer and Information
Sciences, University of Strathclyde
dce@cis.strath.ac.uk Ian Ruthven
Department Computer and Information
Sciences, University of Strathclyde
ir@cis.strath.ac.uk ABSTRACT
Personal Information Management (PIM) is a rapidly growing area of research concerned with how people store, manage and re-find information. A feature of PIM research is that many systems have been designed to assist users manage and re-find information, but very few have been evaluated. This has been noted by several scholars and explained by the difficulties involved in performing PIM evaluations. The difficulties include that people re-find information from within unique personal collections; researchers know little about the tasks that cause people to re-find information; and numerous privacy issues concerning personal information. In this paper we aim to facilitate PIM evaluations by addressing each of these difficulties. In the first part, we present a diary study of information re-finding tasks. The study examines the kind of tasks that require users to re-find information and produces a taxonomy of re-finding tasks for email messages and web pages. In the second part, we propose a task-based evaluation methodology based on our findings and examine the feasibility of the approach using two different methods of task creation.

Categories and Subject Descriptors
H3.3 [Information Search and Retrieval];

General Terms
Measurement,Management,Experimentation,Human Factors

Keywords Personal Information Management, User Evaluation

1. INTRODUCTION
Personal InformationManagement (PIM) is a rapidly growing area of research concerned with how people store, manage and re-find information. PIM systems - the methods Permission to make digital or hard copies of all or part of this work for personal or classroom use is granted without fee provided that copies are not made or distributed for profit or commercial advantage and that copies bear this notice and the full citation on the first page. To copy otherwise, to republish, to post on servers or to redistribute to lists, requires prior specific

FIG. 12

```xml
<?xml version="1.0" encoding="UTF-8" ?>
<entities docID="SIGIR7-p23-elsweiler.pdf" sp_ID="4">
    <entity category="DOC_TITLE" confidence="10" eqcID="12690503" length="62" method="Unique" name="Towards Task-based Personal Information Management Evaluations" name_cat_rec="" offset="48" relevance="100" />
    <entity category="DOC_AUTHOR" confidence="10" eqcID="11344888" length="15" method="Unique" name="David Elsweiler" name_cat_rec="" offset="110" relevance="100" />
    <entity category="DOC_AUTHOR" confidence="10" eqcID="11650196" length="11" method="Unique" name="Ian Ruthven" name_cat_rec="" offset="218" relevance="100" />
    <entity category="DOC_AUTHOR_EMAIL" confidence="10" eqcID="11190325" length="20" method="Unique" name="dce@cis.strath.ac.uk" name_cat_rec="" offset="198" relevance="100" />
    <entity category="DOC_AUTHOR_EMAIL" confidence="10" eqcID="12654652" length="19" method="Unique" name="ir@cis.strath.ac.uk" name_cat_rec="" offset="302" relevance="100" />
    <entity category="DOC_AUTHOR_AFFILIATION" confidence="10" eqcID="14070725" length="72" method="Unique" name="Department Computer and Information Sciences, University of Strathclyde" name_cat_rec="" offset="126" relevance="100" />
    <entity category="DOC_AUTHOR_AFFILIATION" confidence="10" eqcID="14070725" length="72" method="Unique" name="Department Computer and Information Sciences, University of Strathclyde" name_cat_rec="" offset="230" relevance="100" />
    <entity category="ACM_CATEGORIES" confidence="10" eqcID="10359081" length="40" method="Unique" name="H3.3 [Information Search and Retrieval]:" name_cat_rec="" offset="1506" relevance="100" />
    <entity category="ACM_GENERALTERM" confidence="10" eqcID="10168494" length="11" method="Unique" name="Measurement" name_cat_rec="" offset="1559" relevance="100" />
    <entity category="ACM_GENERALTERM" confidence="10" eqcID="9227627" length="10" method="Unique" name="Management" name_cat_rec="" offset="1570" relevance="100" />
    <entity category="ACM_GENERALTERM" confidence="10" eqcID="15110492" length="15" method="Unique" name="Experimentation" name_cat_rec="" offset="1580" relevance="100" />
    <entity category="ACM_GENERALTERM" confidence="10" eqcID="11759261" length="14" method="Unique" name="Human Factors" name_cat_rec="" offset="1595" relevance="100" />
    <entity category="ACM_KEYWORDS" confidence="10" eqcID="12418315" length="31" method="Unique" name="Personal Information Management" name_cat_rec="" offset="1619" relevance="100" />
    <entity category="ACM_KEYWORDS" confidence="10" eqcID="10658363" length="17" method="Unique" name="User Evaluation" name_cat_rec="" offset="1650" relevance="100" />
</entities>
```

FIG. 15

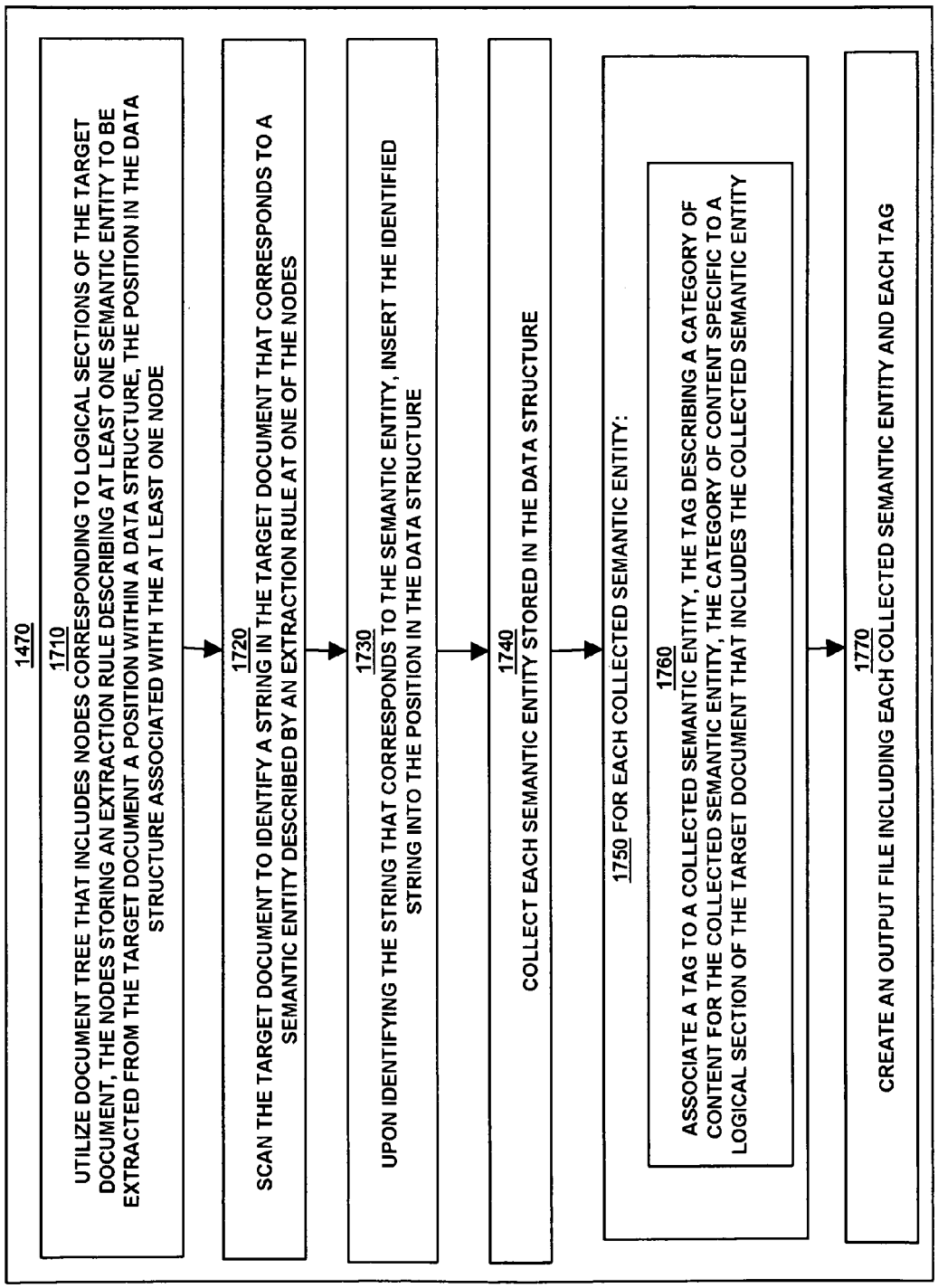

EXTRACTING READING ORDER TEXT AND SEMANTIC ENTITIES

BACKGROUND

Conventional algorithms exist that determine a given document's physical page layout, such as a given document's organization of distinct columns and sections of reading text. One conventional technique extracts a given document's page layout structure by analyzing the spatial configuration of word positions in the given document and graphically representing those word positions. An image of the document can be segmented by applying a recursive procedure to the graphically represented word positions. The original document's segmentation is indicated wherever a prominent gap exists in the graphically represented word positions. The recursive procedure iterates until no prominent gaps can be detected in the graphically represented word positions. Some attempts have been made to leverage information from such a recursive procedure to assist in reading-order text extraction.

Reading-order text extraction is the process by which text from a given document can be placed in the order the text is meant to be read (e.g. left-to-right, top-to-bottom) in lines of text that span across an entire document—as opposed to lines that only span across a column or section of text.

For example, if a given document, such as a newspaper, has two columns of text, then a human reader intuitively knows to read all the text in the left-most column before reading the text in the right-most column. The human reader thereby begins reading text in the right-most column only after reaching the last word in the bottom line of text in the left-most column. By applying reading-order text extraction to the given document, all the text from the right-most column will be placed across a page, left-to-right, and then text from the left-most column is placed on the page after text from the right-most column and no columns or sections will appear on the page.

The ability to accurately extract text in reading-order from segmented documents provides many advantages. Since many documents have different physical layouts, reading-order extraction allows for collecting and organizing text from all documents in a uniform layout. By maintaining the reading-order of the documents while discarding each document's various column and/or section breaks, search algorithms can better find keywords and/or semantic entities that appear in the extracted text.

Current conventional techniques suffer from a variety of deficiencies. Specifically, the recursive procedures used in current techniques fail to take into account character heights and widths that occur before and after the indications of segmentation from a given document. The failure of conventional techniques to take into account such character heights and widths is a critical deficiency as it leads to improperly characterizing line or paragraph breaks as identified segments or identified column breaks in a document.

When conventional techniques cast a paragraph break or line break that occurs within an actual column as the beginning of a new segment or another column, then there is a likelihood that text from the actual column will not be extracted in reading order since the conventional techniques will behave as though it is extracting text from two different columns with unrelated text.

Furthermore, the mechanism in current techniques for finding indications of segmentation from a given document, further fail to account for word starting frequencies, break alignment and/or relative straightness. Thus, conventional techniques often mischaracterize a given document's physical layout. Since conventional techniques risk finding incorrect segmentation of a document's physical layout, then the accuracy of proper reading-order text extraction will be suspect

SUMMARY

Techniques discussed herein significantly overcome the deficiencies of conventional applications such as those discussed above as well as additional techniques also known in the prior art. As will be discussed further, certain specific embodiments herein are directed to an Extractor.

The Extractor can receive a source document which includes groups of strings (e.g. words) organized within a number or columns and/or sections. The Extractor scans the source document to identify each string and creates bounding boxes for each string in the source document. The bounding box for each string describes the vertical and horizontal placement of the string within the source document. For example, a string's bounding box can provide X-Y coordinates that describe where a string (or a string portion) is located in the source document.

Based on bounding boxes that describe the positions of individual strings within a source document, the Extractor identifies a physical layout (e.g. section breaks, column breaks) of the source document. The Extractor builds a target document map to describe the placement of section and column breaks within the source document. For each area framed by section and column breaks in the target document map, the Extractor matches bounding boxes that describe string positions that fall within the position of the area. The Extractor then inserts the strings in a target document according to a reading order—absent the physical layout of the source document.

Upon creation of the target document, the Extractor scans the target document to identify any strings that correspond with predefined semantic entities. The Extractor uses a document tree to extract the semantic entities from the target document, tag the extracted semantic entities, and to store the extracted semantic entities in a data structure. The document tree includes nodes that correspond with logical sections (e.g. title, author section, abstract) of the target document. Each node has an extraction rule that describes a particular semantic entity that pairs with the node.

When the Extractor identifies the correct semantic entity for a particular node in the document tree, the semantic entity is stored in a position within a data structure that corresponds with the node. The Extractor tags the stored semantic entity. The tag describes a category of content (e.g. "doc_title,", "doc_author") that is related to the logical section of the target document from which the stored semantic entity was extracted. When all semantic entities have been extracted, stored and tagged, the Extractor creates an output file, such as an Extensible Markup Language (XML) file, that includes each semantic entity and its respective tag(s).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Extractor, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 2 is an example block diagram of a source document having a physical layout segmented by multiple sections according to embodiments herein.

FIG. 12 is an example block diagram of a target document created by an Extractor according to embodiments herein.

FIG. 15 is an example block diagram of an output file of tagged semantic entities according to embodiments herein.

FIG. 20 is a flowchart of an example of processing steps performed by the Extractor to create an output file with semantic entities and tags for each semantic entity according to embodiments herein.

DETAILED DESCRIPTION

Figure 1:
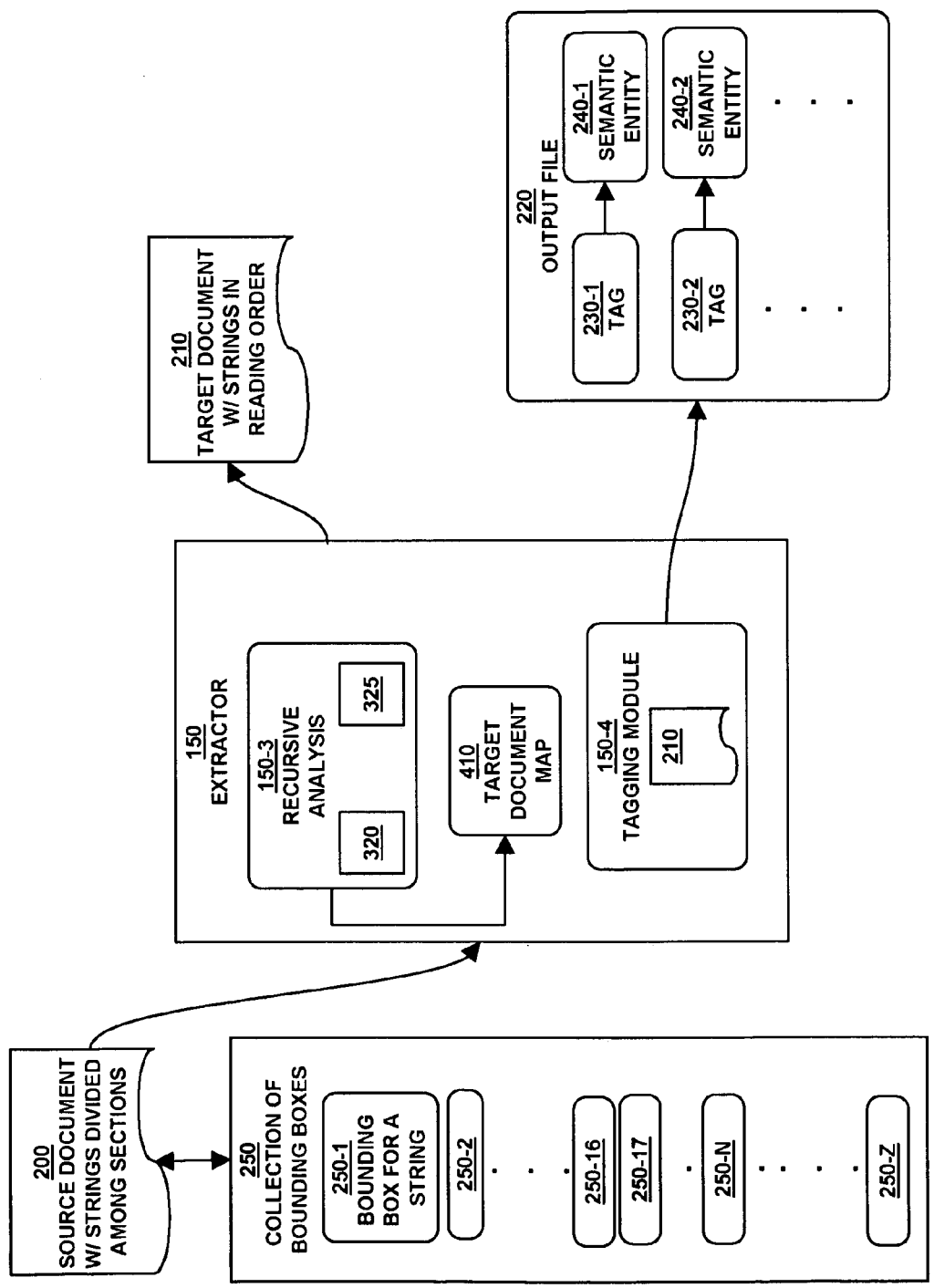
FIG. 1 is an example block diagram of an Extractor producing a target document and an output file based on a received source document and a collection of bounding boxes associated with strings in the source document according to embodiments herein.

FIG. 1 is an example block diagram of an Extractor 150 producing a target document 210 and an output file 220 based on a received source document 200 and a collection of bounding boxes 250 associated with strings in the source document 200 according to embodiments herein.

The Extractor 150 receives a collection of strings within a source document 200 and bounding boxes 250-1 . . . 250-Z for each string. Each bounding box 250-1 . . . 250-Z describes a position of at least a portion of a corresponding string in the source document 200. The source document 200 includes multiple sections for presenting portions of the collection of strings in the source document 200, such as column breaks and/or sub-section breaks within a column.

By processing vertical position information from the bounding boxes 250-1 . . . 250-Z, the Extractor 150 determines string densities 320 that occur in vertical portions of the source document 200. By processing horizontal position information from the bounding boxes 250-1 . . . 250-Z, the Extractor 150 determines string densities 325 that occur in the horizontal portions of the source document 200.

The Extractor 150 performs a recursive analysis 150-3 on the vertical and horizontal string densities 320, 320 in order to detect the section boundaries in the source document 200. As the Extractor 150 performs recursive analysis 150-3, the Extractor 150 builds a target document map 410 that reflects the segmentation detected among the vertical and horizontal string densities 320, 320—where the segmentation is represented as indications of string absences within the string densities 320, 320.

Based on the position information provided by each bounding box 250-1 . . . 250-Z, the Extractor 150 maps strings to areas in the target document map 410 that are framed by the section boundaries detected in the source document's 200 physical layout. When inserting the strings into a target document 210, the Extractor 150 utilizes the areas in the target document map 410 to determine which strings share the same sentence—but the strings are inserted into the target document 210 according to a reading order and without the segmentation (i.e. column breaks, sub-section breaks) of the source document 200.

Upon arranging the collection of strings according to the reading order in the target document 210, the Extractor 150 utilizes a tagging module 150-4 to collect semantic entities 240 from the target document 210. For each collected semantic entity 240, the Extractor 150 tags the collected semantic entity 240 with a tag 230 that describes a category of content that corresponds to a logical section of the target document 210 from which the semantic entity was extracted. The Extractor 150 creates an output file 220, such as an XML file, that includes each collected semantic entity 240 with a corresponding tag 230.

It is understood that, for various embodiments of the Extractor, reading order of the text (or strings) indicates how a human would sequentially read text in order to properly understand each sentence of each paragraph or each section.

It is further understood that, for various embodiments of the Extractor, a semantic entity is string(s) built from a sequence of one or more text (i.e. text tokens) that can be classified into predefined categories such as the names of persons, living or inanimate objects, organizations, locations, products, expressions of times, quantities, monetary values, percentages and the like.

Figure 2:
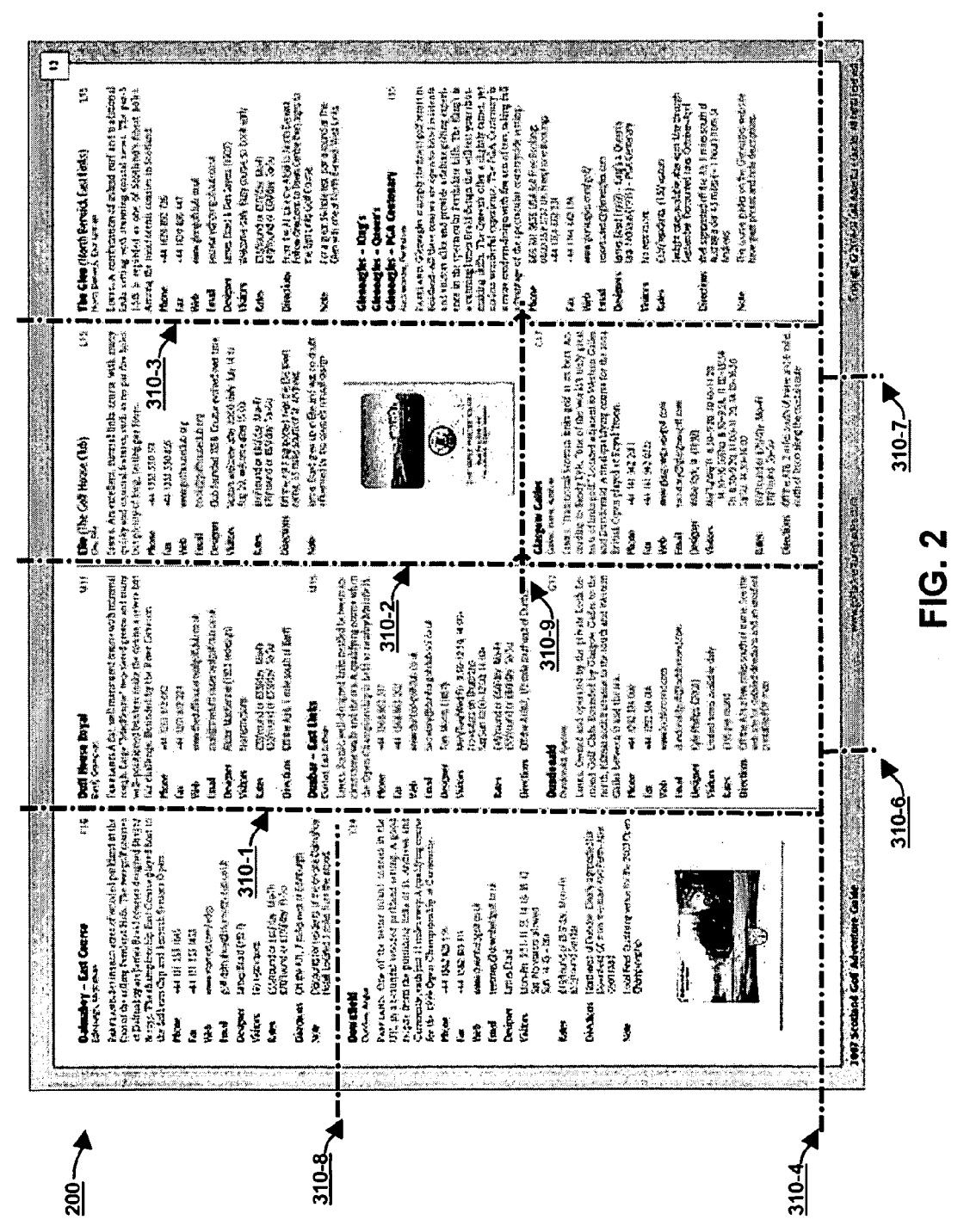

FIG. 2 is an example block diagram of a source document 200 having a physical layout segmented by multiple sections 310-1, 310-2, 310-3, 310-4, 310-5, 310-6, 310-7, 310-8, 310-9 according to embodiments herein. As illustrated in FIG. 1, the source document organizes text (i.e. a collection of strings) amongst column and sub-section breaks. Specifically, the source document 200 contains three sections 310-1, 310-2, 310-3, and two sub-sections 310-6, 310-7 where there is very little text—thereby creating vertical column breaks. In addition, the source document 200 contains one section break 310-4 and two sub-section breaks 310-8, 310-9 that create horizontal sections in the source document's 200 physical layout.

When reading text within a column or sub-section break 310-1 . . . 310-9, a human knows to traverse all the text within a column or sub-section break 310-1 . . . 310-9 and not to include a reading of other text in another column or sub-section break 310-1 . . . 310-9. Thus, the reading pattern used by a human is to read text on a "per-section" basis rather than reading across the source document 200 by traversing column or sub-section breaks 310-1 . . . 310-9.

Figure 3:
FIG. 3 is an example block diagram of a collection of bounding boxes describing positions of strings within a source document according to embodiments herein.

Turning now to FIG. 3, FIG. 3 is an example block diagram of a collection of bounding boxes 250 describing positions of strings within a source document 200 according to embodiments herein. A bounding box can represent a position of a rectangular area encompassed by a string (or a string portion) in the source document. However, the Extractor is not limited to bounding boxes representing only rectangular areas and can be interpreted as a positional description of a string (or a string portion) in the source document.

As illustrated in FIG. 3, the sixteenth bounding box 250-16 describes a position of a string that occurs just before a column break in the source document 200. The seventeenth bounding box 250-17 describes the position of the next string in the sentence. However, the seventeenth bounding box 250-17 does not describe a position directly to the right of the sixteenth bounding box 250-16, such as over the column break. Instead, the seventeenth bounding box 250-17 describes a position such that the corresponding string is the first string in a line of text directly below the line of text that includes the sixteenth bounding box 250-16.

When arranging the sixteenth bounding box 250-16 and the seventeenth bounding box 250-17 according to a reading order in a target document 200, the Extractor 150 aligns the bounding boxes 250-16, 250-17 such that no column break (or section break) will force the seventeenth bounding box 250-17 to occur at a different line of text.

An additional bounding box 250-N describes a position of a string at the beginning of a line of text and the last bounding box 250-Z describes a position of the left-most, bottom-most string in the source document 200. When the Extractor 150 arranges the collection of strings according to the reading order in the target document 210, the string associated with the additional bounding box 250-N will not necessarily appear as the first string in a line of text. Nonetheless, the string associated with the last bounding box 250-Z will be the last string in the target document 210.

Figure 4:
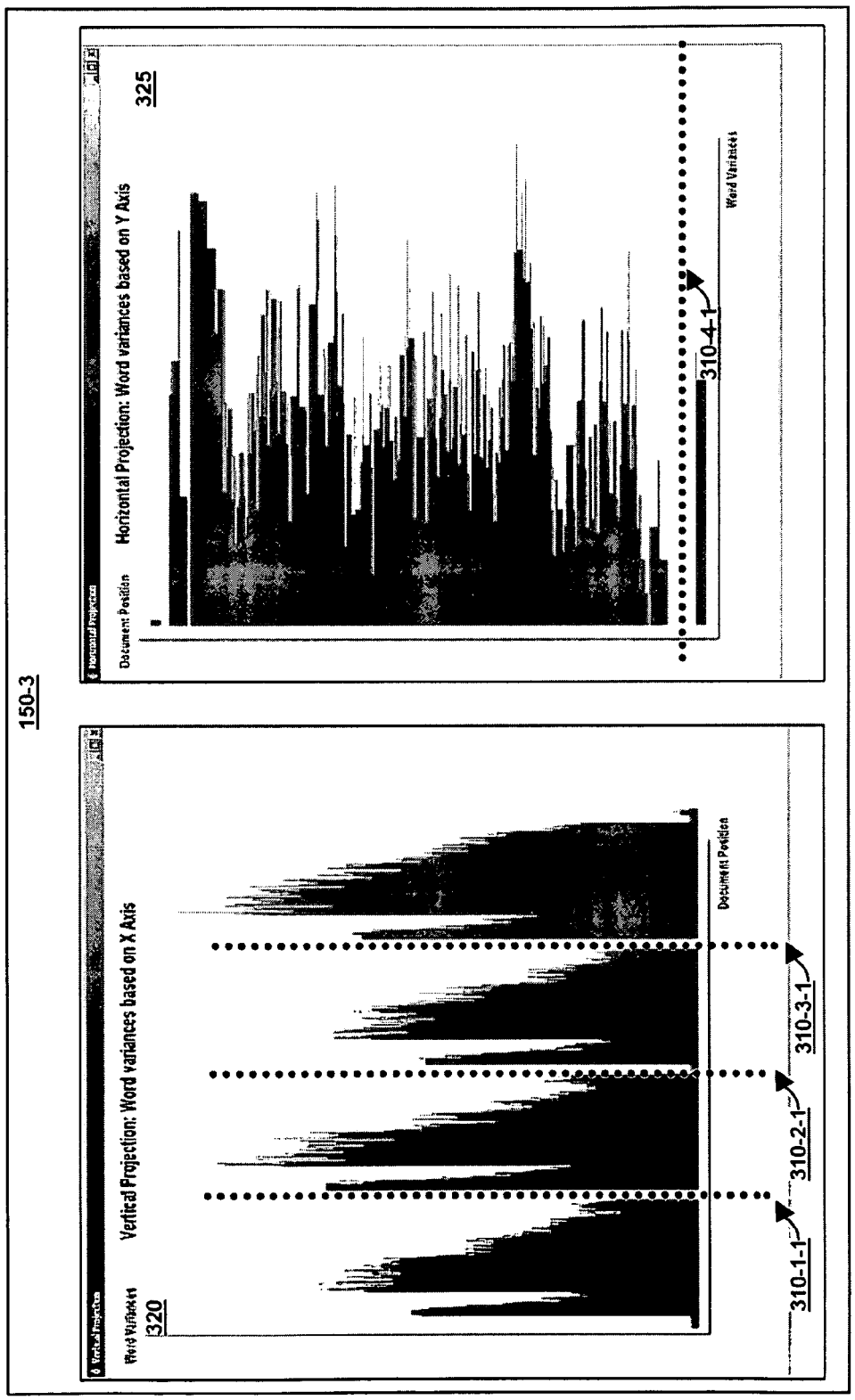
FIG. 4 is an example block diagram of section boundaries detected by an Extractor within string densities occurring in horizontal and vertical portions of a source document according to embodiments herein.
Figure 5:
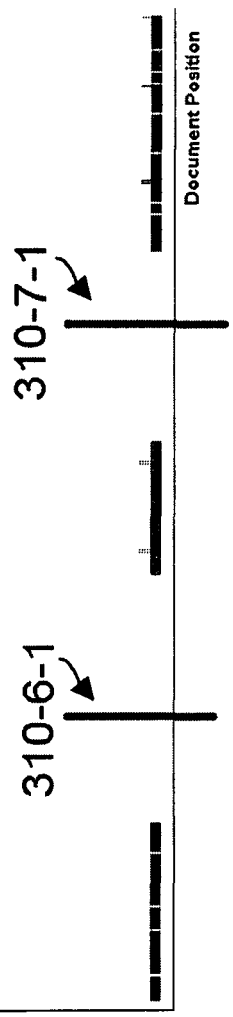
FIG. 5 is an example block diagram of sub-section boundaries detected by an Extractor within strings densities occurring in vertical portions of a source document according to embodiments herein.
Figure 6:
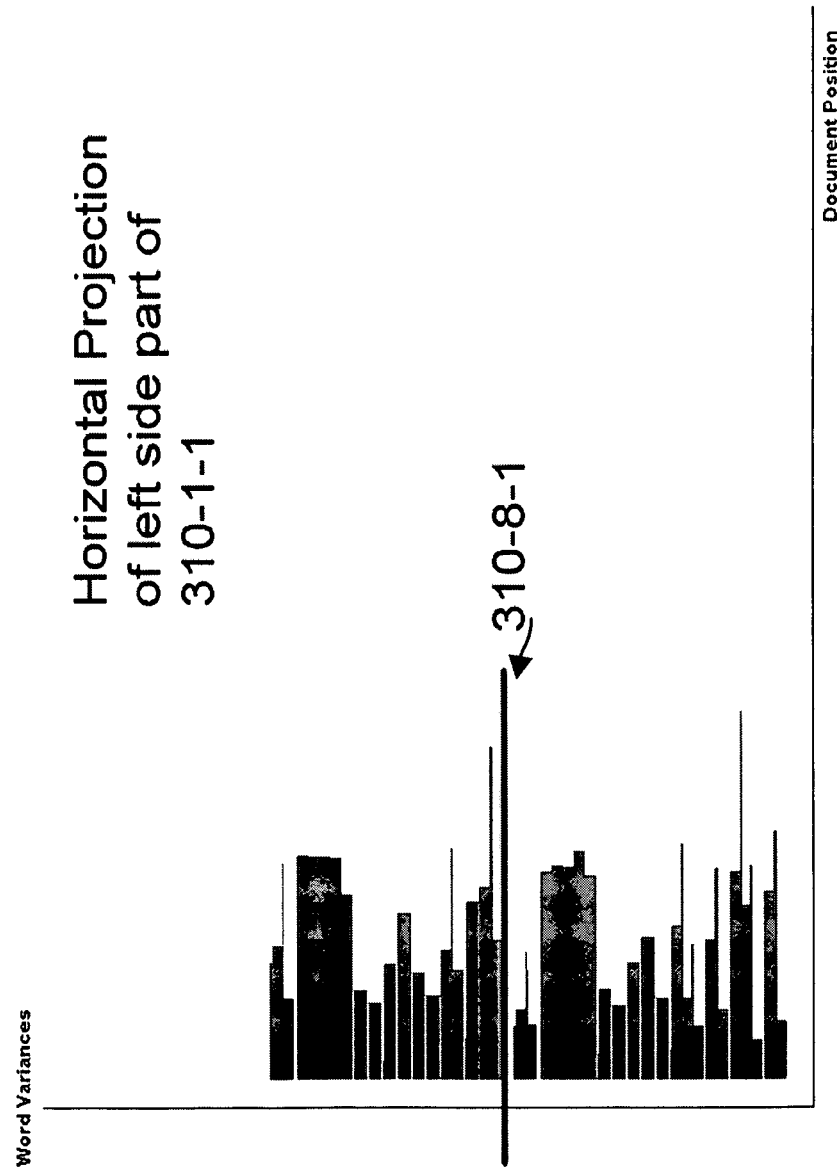
FIG. 6 is an example block diagram of sub-section boundaries detected by an Extractor within strings densities occurring in horizontal portions of a source document according to embodiments herein.
Figure 7:
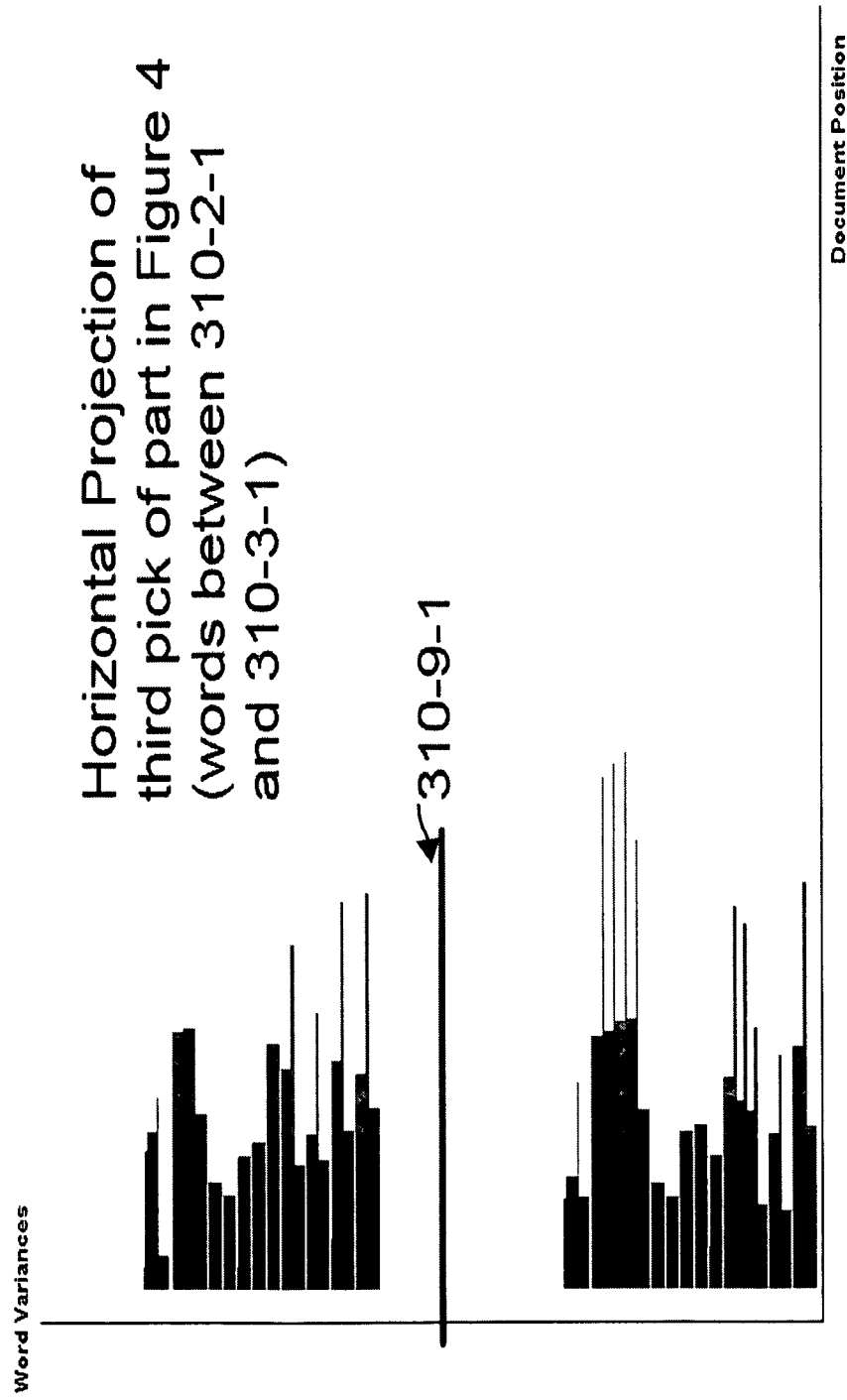
FIG. 7 is an example block diagram of sub-section boundaries detected by an Extractor within strings densities occurring in horizontal portions of a source document according to embodiments herein.

FIG. 4 is an example block diagram of section boundaries 310-1-1, 310-2-1, 310-3-1, 310-4-1 detected by an Extractor 150 within string densities 320, 325 occurring in horizontal and vertical portions of a source document 200 according to embodiments herein. Also, FIGS. 5-7 are example block diagrams of sub-section boundaries 310-6-1, 310-7-1, 310-8-1, 310-9-1 detected by the Extractor 150 within string densities 320, 325 occurring in vertical or horizontal portions of the source document 200 according to embodiments herein. As the Extractor 150 performs a recursive analysis 150-3 on the string densities 320, 325, the Extractor 150 builds a target document map 410.

Figure 8:
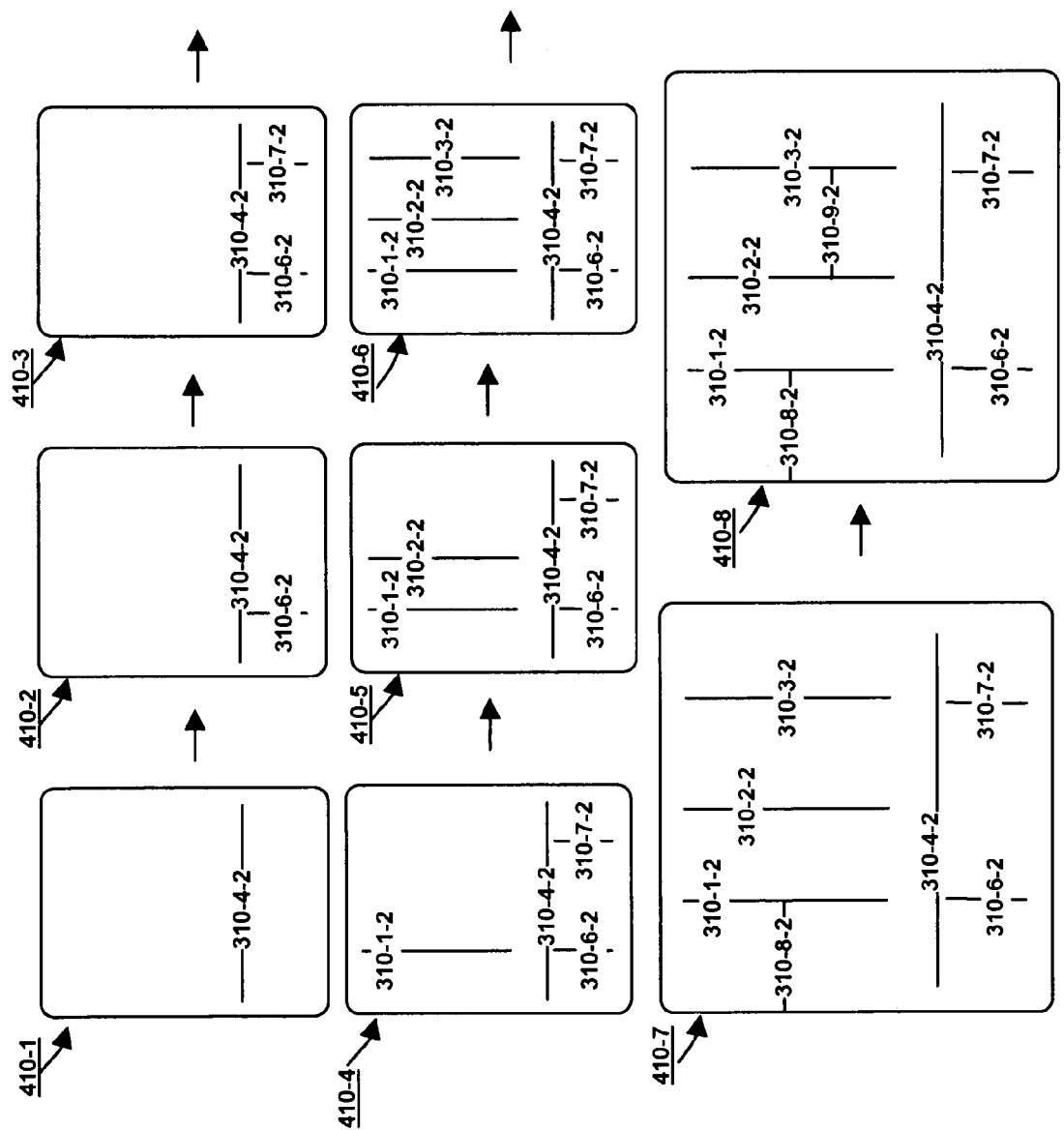
FIG. 8 is an example block diagram of an Extractor recursively building a target document map based on valid section and sub-section boundaries detected among strings densities occurring in horizontal and vertical portions according to embodiments herein.

FIG. 8 is an example block diagram of an Extractor 150 recursively building a target document map 410 based on valid section 310-1-1, 310-2-1, 310-3-1, 310-4-1 and sub-section 310-6-1, 310-7-1, 310-8-1, 310-9-1 boundaries detected among strings densities 320, 325. Aspects of the recursive analysis 150-3 performed by the Extractor 150 illustrated in FIGS. 4-7 will be discussed in conjunction with a discussion of aspects illustrated in FIG. 8.

Upon receiving the collection of strings in the source document 200 and receiving the bounding boxes 250, the Extractor 150 processes vertical position information and horizontal position information from the bounding boxes 250-1 . . . 250-Z. The Extractor 150 thereby determines string densities 320 that occur in vertical portions of the source document 200 and determines string densities 325 that occur in horizontal portions of the source document 200. In order to build a target document map 410 segmented according to the physical layout of the source document 200, the Extractor 150 detects and validates indications of string absences within the string densities 320, 325 as it recursively analyzes both the vertical and horizontal string densities 320, 325.

During an initial recursive pass over the string densities 320, 325, the Extractor 150 identifies a section indication 310-1-1 amongst the vertical string densities 320 by locating a continuously straight span. It is understood that a continuously straight span among the vertical string densities 320 is wider than a character width associated with (i) a string density positioned before the span and (ii) a string density positioned after the span.

Further, the Extractor 150 defines a threshold that describes an allowable amount of string density to be present in the continuously straight span. Thus, the continuously straight span need not represent a complete absence of text in order to be considered a section indication.

If the continuously straight span is wider than such character widths, then the Extractor 150 knows that the section indication 310-1-1 is a candidate section boundary for the target document map 410. If the continuously straight span is not wider than such character widths, then the section indication 310-1-1 is an invalid span and will not be included in the target document map 410. It is noted that conventional techniques fail to disclose a recursive analysis that includes validating spans with respect to character widths.

Still during the initial recursive pass over the string densities 320, 325, the Extractor 150 identifies a section indication 310-4-1 amongst the horizontal string densities 325 by locating another continuously straight span. It is understood that this continuously straight span among the horizontal string densities 325 must have a height that is greater than a character height associated with (i) a string density positioned before the span and (ii) a string density positioned after the span.

Further, the Extractor 150 defines another threshold that describes an allowable amount of string density to be present in this continuously straight span. Thus, the continuously straight span need not represent a complete absence of text in order to be considered a section indication.

If the continuously straight span is higher than such character heights, then the Extractor 150 knows that the section indication 310-4-1 is a candidate section boundary for the target document map 410. If the continuously straight span is does not exceed the character heights, then the section indication 310-4-1 is an invalid span and will not be included in the target document map 410. Again, it is noted that conventional techniques fail to disclose a recursive analysis that includes validating spans with respect to character heights.

When both section indications 310-1-1, 310-4-1 are determined to be valid spans, the Extractor 150 compares both section indications 310-1-1, 310-4-1 to identify which of the two section indications 310-1-1, 310-4-1 is the widest. The Extractor 150 determines that the section indication 310-4-1 detected in the horizontal string densities 325 is the widest. Thus, the position of the "widest" section indication 310-4-1 is identified and the Extractor 150 creates a section boundary 310-4-2, based on the position of the "widest" section indication 310-4-1, in a version of the target document map 410-1 (see FIG. 8).

In FIG. 5, the Extractor 150 continues the recursive analysis 150-3 with respect to string densities that occur before the "widest" section indication 310-4-1. The Extractor 150 determines that no "valid" spans exist in horizontal string densities 325 before the "widest" section indication 310-4-1. However, sub-section indications 310-6-1, 310-7-1 occur in vertical string densities 320 occurring before the "widest" section indication 310-4-1.

Upon determining that both sub-section indications 310-6-1, 310-7-1 are valid spans, and therefore candidate section boundaries, the Extractor 150 identifies the position of the right-most sub-section indication 310-6-1 and creates a section boundary 310-6-2, in the target document map 410-2 based on the position of the right-most sub-section indication 310-6-1. Next, the Extractor 150 identifies the position of the sub-section indication 310-7-1 and a section boundary 310-7-2, based on the position of the sub-section indication 310-7-1, is created in an updated version of the target document map 410-3 (see FIG. 8).

While one branch of the recursive analysis detects sub-section indications 310-6-1, 310-7-1, the Extractor 150 concurrently analyzes string densities that occur after the "widest" section indication 310-4-1 that was detected during the first recursive pass as well.

As illustrated in FIG. 4, the Extractor 150 again detects a right-most section indication 310-1-1 that occurs after the "widest" section indication 310-4-1 in the vertical string densities 320. Upon validating the section indication 310-1-1 as a candidate section boundary, the Extractor 150 identifies the position of the section indication 310-1-1 and a section boundary 310-1-2, based on the position of the section indication 310-1-1, is created in an updated version of the target document map 410-4 (see FIG. 8).

The recursive analysis 150-3 can again split into another sequence of iterations in order to look for section indications that occur before and after the section indication 310-1-1 as well. With regard to string densities that occur after the section indication 310-1-1, the widest, valid spans will be section indications 310-2-1, 310-3-1 that are detected during two recursive passes, respectively. Upon validating the section indications 310-2-1, 310-3-1 as candidate section boundaries, the Extractor 150 identifies the positions of the section indications 310-2-1, 310-3-1 and section boundaries 310-2-2, 310-3-2 based on the positions of the section indications 310-2-1, 310-3-1 are created in updated respective versions of the target document map 410-5, 410-6 (see FIG. 8).

As shown in FIG. 6, the recursive analysis 150-3 continues as discussed above to further create another sub-section boundary 310-8-2 for updated target document map versions 410-7 that is based on a position of the detected and validated sub-section indication 310-8-1.

As shown in FIG. 7, the recursive analysis 150-3 continues as discussed above to further create another sub-section boundary 310-9-2 for updated target document map versions 410-8 that is based on a position of a detected and validated sub-section indication 310-9-1.

It is understood that each version 410-1 ... 410-8 of the target map can be generated recursively and not in a completely sequential fashion. Thus, for example, after creating the first version 410-1, the Extractor 150 can concurrently perform the analysis required to create versions 410-2, 410-3 while it performs the analysis required to create version 410-4, 410-5, 410-6.

Figure 9:
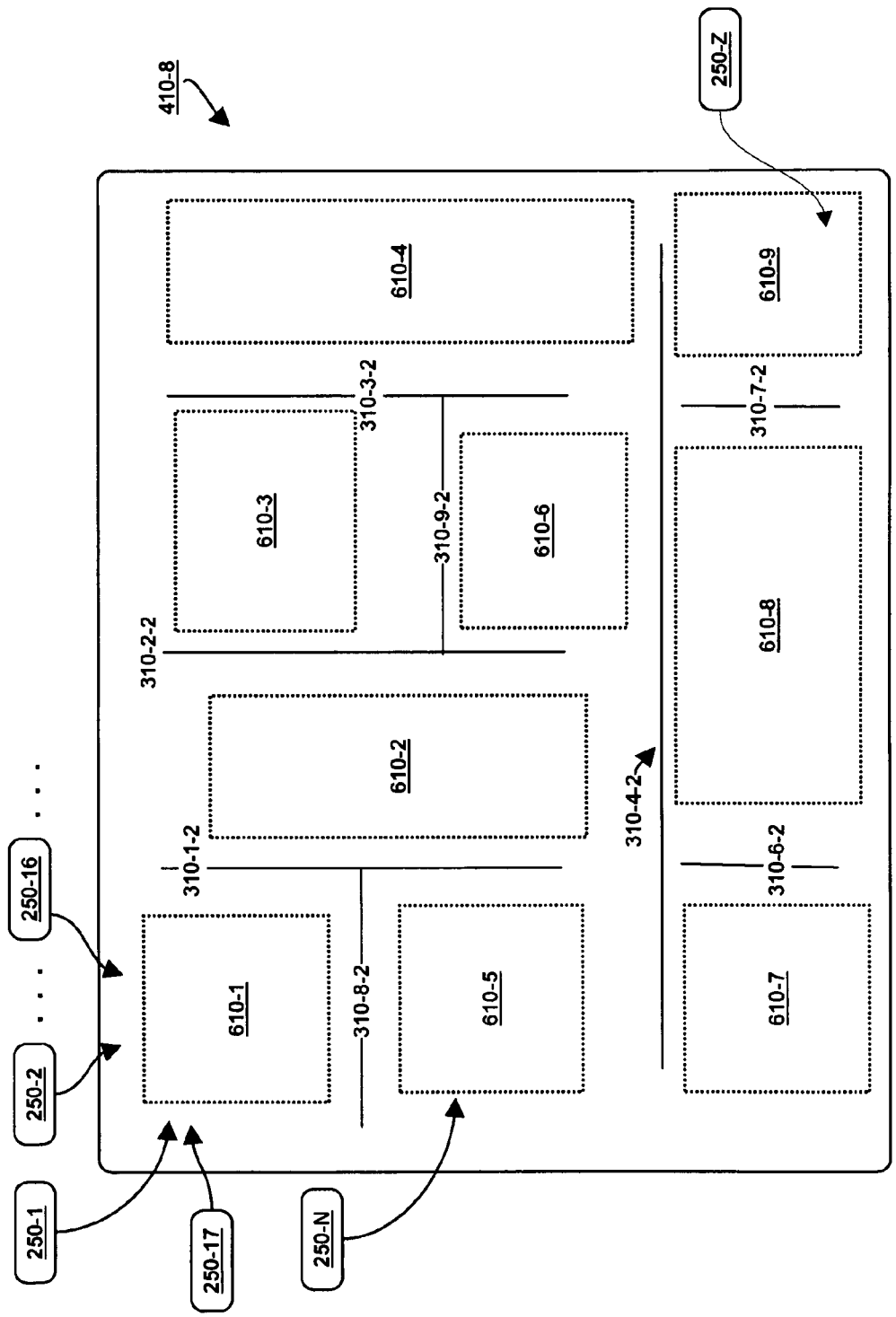
FIG. 9 is an example block diagram of an Extractor identifying areas framed within section boundaries according to embodiments herein.

Turning now to FIG. 9, FIG. 9 is an example block diagram of an Extractor 150 identifying areas 610-1, 610-2, 610-3, 610-4, 610-5, 610-6, 610-7, 610-8, 610-9 framed within section boundaries 310-1-2 ... 310-8-2 according to embodiments herein.

The Extractor 150 identifies areas 610-1 ... 610-9 in the target document map 410-8. Each of the areas 610-1 ... 610-9 are framed by the section boundaries 310-1-2 ... 310-8-2 which reflect the segmentation of the source document 200. Based on the position of each area 610-1 ... 610-9 within the target document map 410-8, the Extractor 150 arranges each area 610-1 ... 610-9 to support the reading order such that a first ordered area 610-1 is the left-most-and-top-most area 610-1 and the last ordered area 610-9 is the right-most-and-bottom-most area 610-9.

For each area 610-1 ... 610-9 of the target document 410-8, the Extractor 150 identifies each bounding box that describes a string position that maps to a coordinate included within the area. For example, bounding boxes 250-1, 250-2 ... 250-16, 250-17 map to the first-ordered area 610-1, the additional bounding box 250-N maps to the fifth ordered area 610-5 and the final bounding box 250-Z maps to the last ordered area 610-9. It is understood that other multiple bounding boxes can map to the other ordered areas 610-2, 610-3, 610-4, 610-6, 610-7, 610-8 as well.

For each bounding box 250 that maps to the an ordered area 610, the Extractor 150 arranges the particular mapped bounding boxes 250 according to the reading order. The Extractor 150 defines a character spacing threshold that describes an amount of allowable spacing between two string characters and defines a string spacing threshold that describes an amount of spacing between two strings.

When the Extractor 150 identifies a particular bounding box 250 the maps to a particular area 610 in the target document map 410-8, the Extractor 150 identifies a previous bounding box with respect to a position of the particular bounding box. If a spacing between the particular bounding box and the previous bounding box is within the character spacing threshold, the Extractor 150 combines the bounding boxes to form a complete string.

However, if the spacing between the particular bounding box and the previous bounding box is at least equal to the string spacing threshold, the Extractor 150 includes a space between the particular bounding box and the previous bounding box such that the bounding boxes reflect two separate strings in the target document 210.

Figure 10:
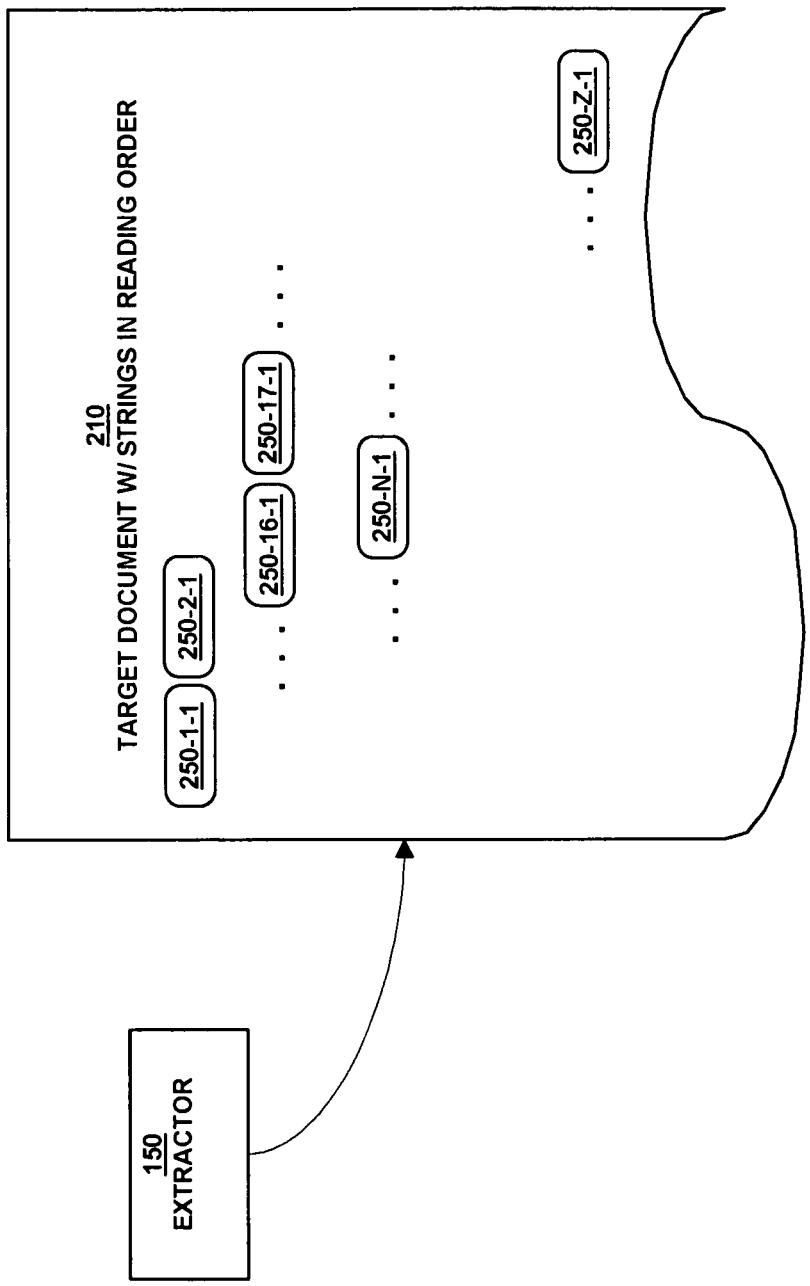
FIG. 10 is an example block diagram of an Extractor providing a target document with strings from a source document arranged in a reading order according to embodiments herein.

Regarding FIG. 10, FIG. 10 is an example block diagram of an Extractor 150 providing a target document 210 with strings from a source document 200 arranged in a reading order according to embodiments herein.

The Extractor 150 sequentially inserts string content from each bounding box into the target document according to the reading order. For example, the bounding boxes that map to the first ordered area 610-1 will be sequentially inserted into the target document 210 such that the strings associated with bounding boxes will traverse across the target document 210, left-to-right, without any column or section breaks.

For example, although a column break 310-1 in the source document 200 forces the strings 250-16-1, 250-17-1 associated the sixteenth and seventeenth bounding boxes 250-16, 250-17 to appear on different lines of text, the Extractor 150 inserts the strings 250-16-1, 250-17-1 in sequence in the same line of text in the target document 210.

Similarly, the Extractor 150 inserts the strings content 250-N-1 associated with additional bounding box 250-N in a line of text that occurs after the strings 250-16-1, 250-17-1 associated the sixteenth and seventeenth bounding boxes. However, where the additional bounding box 250-N described a position of string starting at a line within a column in the source document 200, the string content 250-N-1 associated with additional bounding box 250-N appears within a line of text in a sequence of strings. Finally, since the final bounding box 250-Z reflects the last position within the last ordered area 610-9, string content 250-Z-1 associated with additional bounding box 250-Z is the last string inserted in the target document 210.

Figure 11:
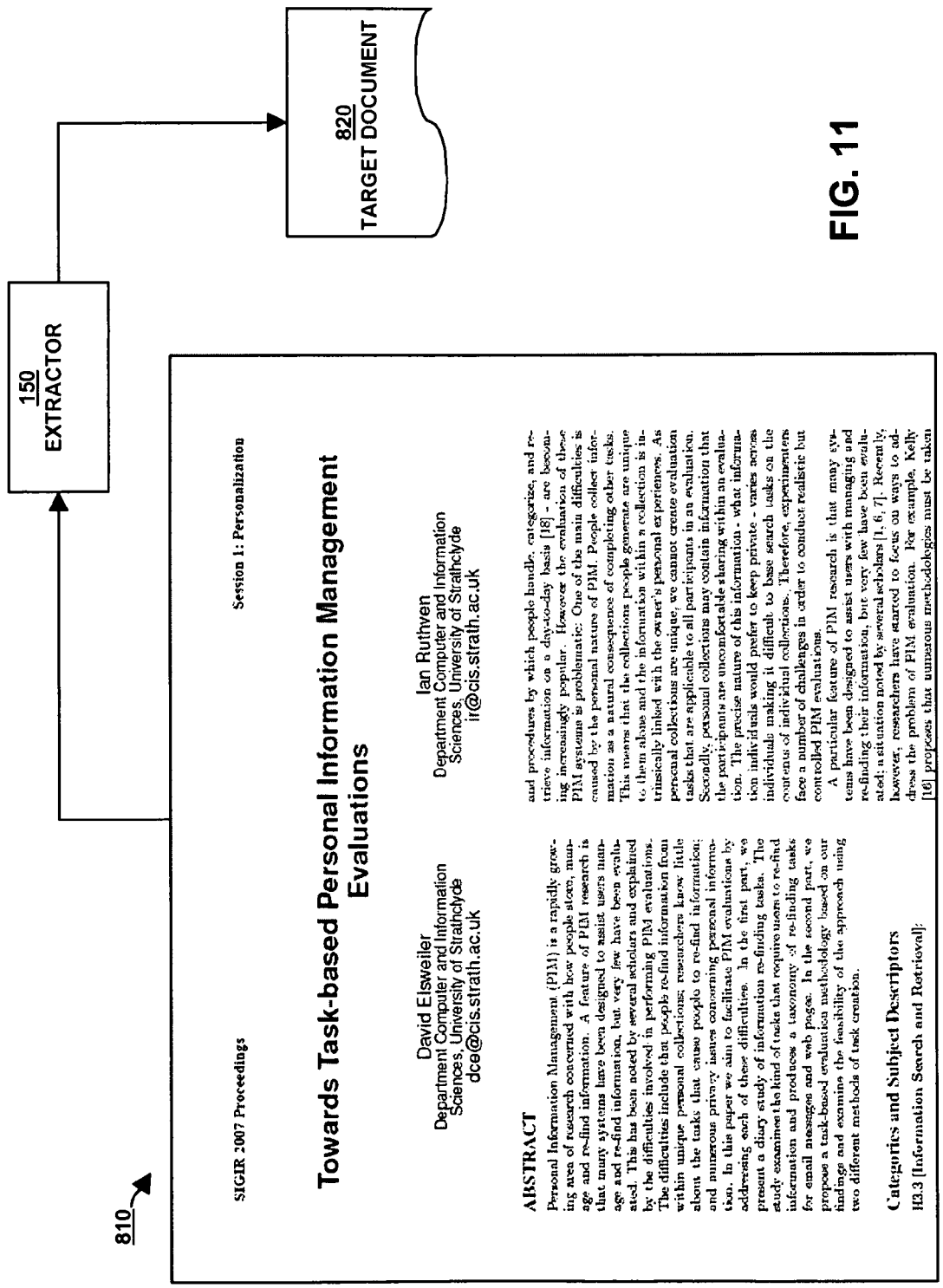
FIG. 11 is an example block diagram of an Extractor creating a target document based on a source document according to embodiments herein.

FIG. 11 is an example block diagram of an Extractor 150 creating a target document 820 based on a source document 810 according to embodiments herein. As illustrated in FIG. 11, the Extractor 150 receives a source document 810 with strings organized within columns breaks.

As shown in FIG. 12, the Extractor 150 produces a target document 820 that organizes the strings from the source document 810 according to a reading order—but without any of the column breaks.

Figure 13:
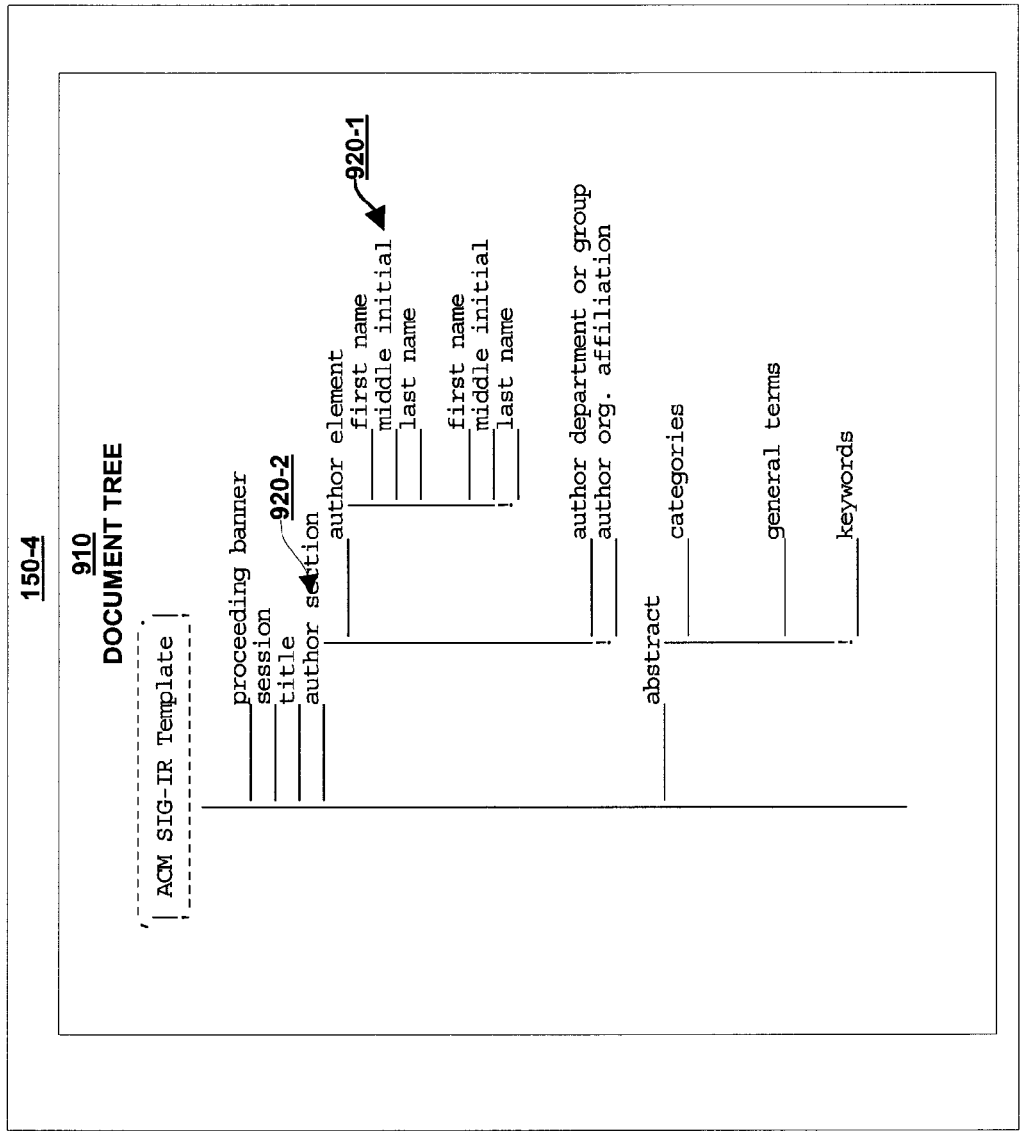
FIG. 13 is an example block diagram of a document tree with nodes that correspond to logical sections of a target document according to embodiments herein.

FIG. 13 is an example block diagram of a document tree 910 with nodes 920 that correspond to logical sections of a target document 820 according to embodiments herein. For example, the document tree 910 includes a node 920-1 that corresponds to a title heading of the target document 910. Another 920-2 corresponds to text that represents the first name of an author in an author section of the target document 820. It is understood that the document tree 910 can have multiple various nodes for many types of logical sections of the target document 820, such as "author department," "abstract," "session," "keywords," etc.

Each node 920 stores an extraction rule(s) that describes semantic entities that are to be extracted from the target document 820 and inserted into a position within a data structure—where the position in the data structure is associated with a particular node 920.

Figure 14:
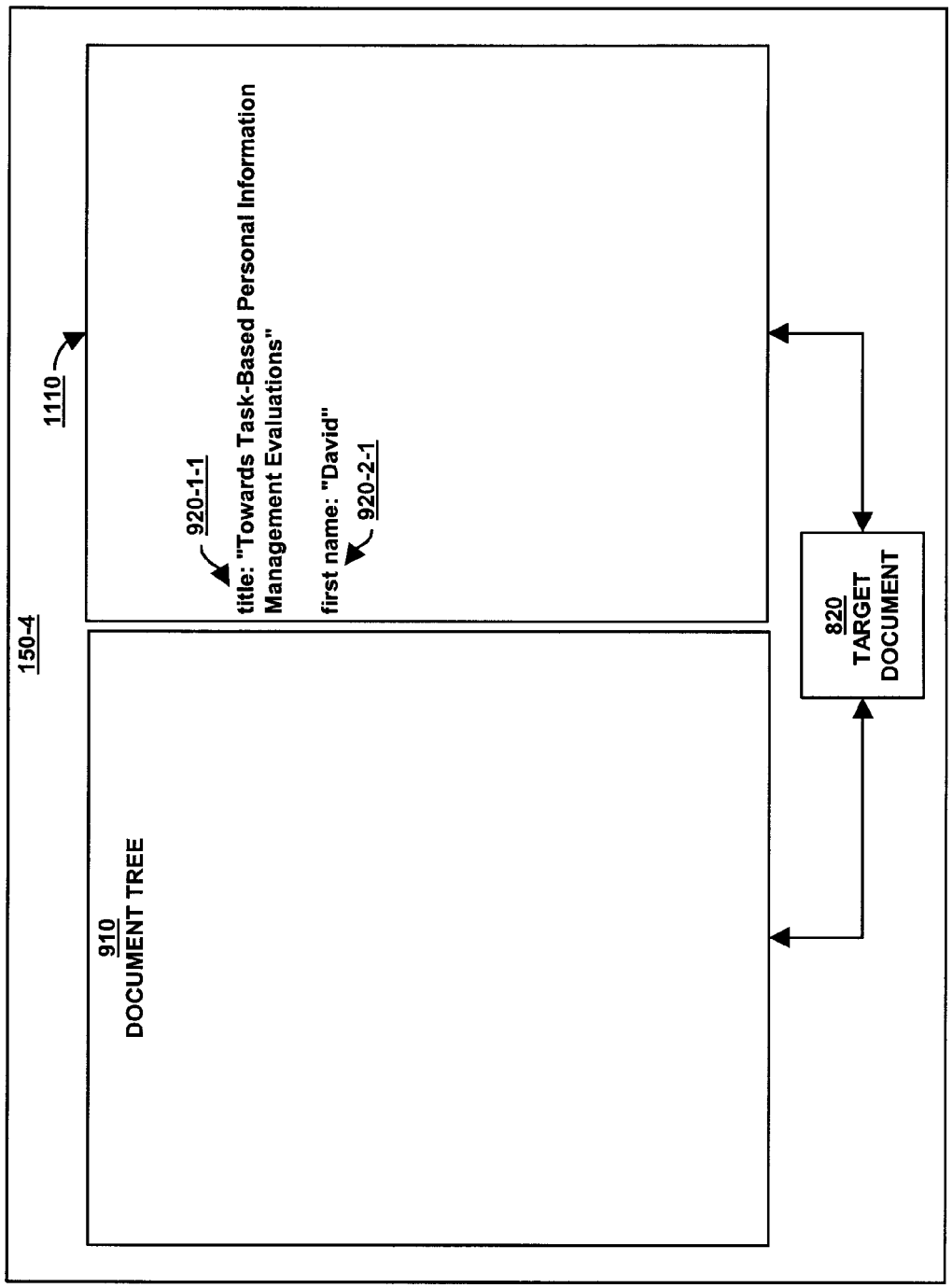
FIG. 14 is an example block diagram of semantic entities extracted from a target document and inserted into a data structure position that corresponds with anode of a document tree to embodiments herein.

FIG. 14 is an example block diagram of semantic entities extracted from a target document 820 and inserted into a data structure position that corresponds with a node 920 of a document tree 910 according to embodiments herein.

The Extractor 150 scans the target document 820 to identify a string(s) in the target document 820 that correspond to a semantic entity described by node extraction rules. For example, a "title" node 920-1 describes an extraction rule for extracting "Towards Task-based Personal Information Management Evaluations" from the target document 820. Upon identifying "Towards Task-based Personal Information Management Evaluations" as a semantic entity, the Extractor 150 inserts "Towards Task-based Personal Information Management Evaluations" into a position 920-1-1, within in a data structure 1110, that corresponds with the "title" node 920-1.

In another example, the "first name" node 920-2 describes an extraction rule for extracting "David" from the target document 820. Upon identifying "David" as a semantic entity, the Extractor 150 inserts "David" into a position 920-2-1, within in the data structure 1110, that corresponds with the "first name" node 920-2.

FIG. 15 is an example block diagram of an output file of tagged semantic entities according to embodiments herein. The Extractor 150 collects each semantic entity stored in the data structure 1110 and associates a tag with each collected semantic entity. A tag describes a category of content that is specific to a logical section of the target document 820 that includes the collected semantic entity. For example, the Extractor 150 associates a "DOC_TITLE" tag with the semantic entity of "Towards Task-based Personal Information Management Evaluations" from position 920-1-1 in the data structure 1110. Further, the Extractor 150 associates a "DOC_AUTHOR" tag with the semantic entity of "David" from position 920-2-1 in the data structure 1110. The Extractor 150 thereby creates an output file 1210 that includes each collected semantic entity and each tag.

Figure 16:
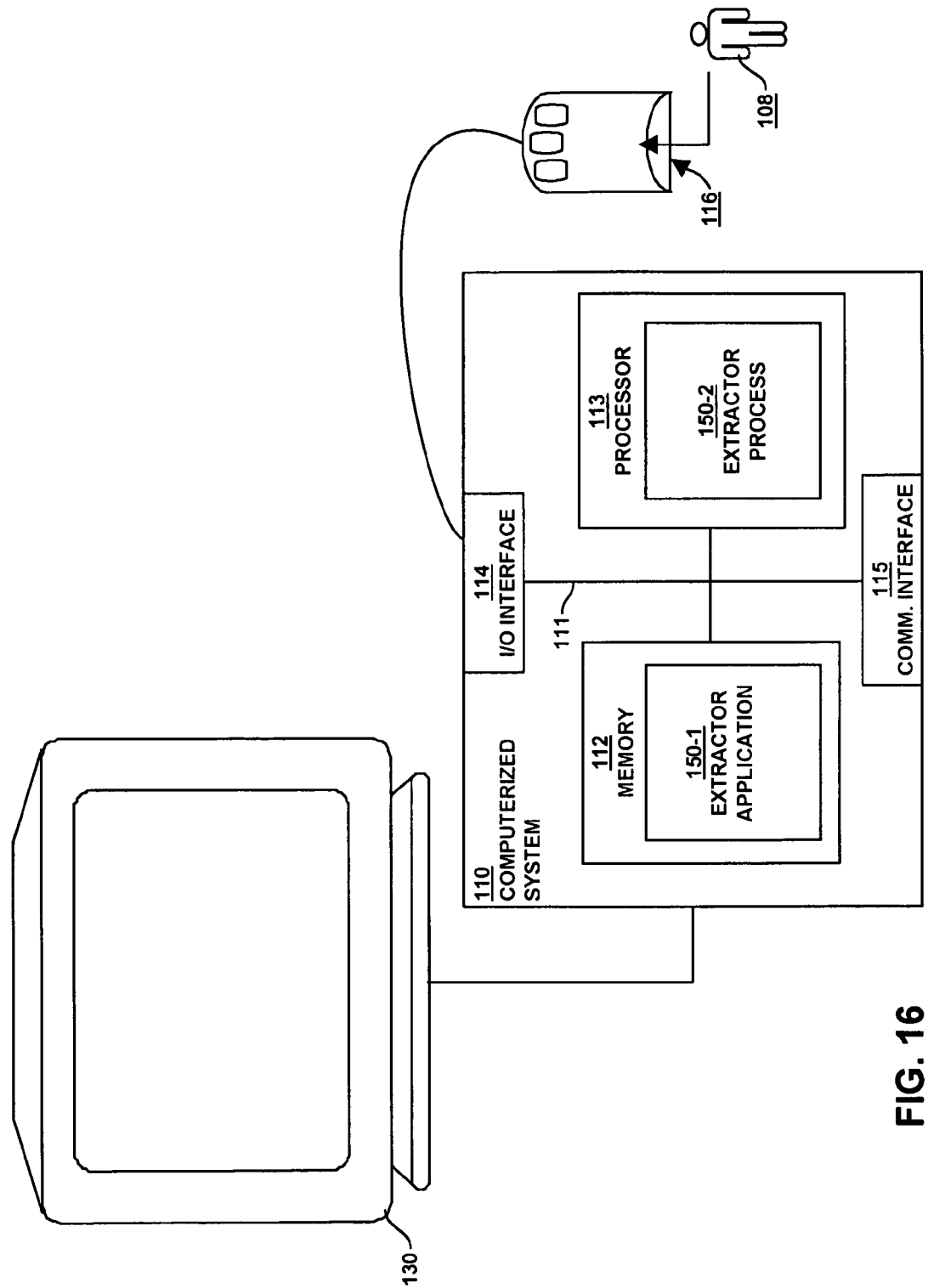
FIG. 16 is an example block diagram illustrating an architecture of a computer system that executes an Extractor application and/or an Extractor process according to embodiments herein.

FIG. 16 is an example block diagram illustrating an architecture of a computer system 110 that executes, runs, interprets, operates or otherwise performs an Extractor application 150-1 and/or Extractor process 150-2 (e.g. an executing version of an Extractor 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Extractor 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Extractor application 150-1 and/or the Extractor process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Extractor application 150-1. Execution of the Extractor application 150-1 in this manner produces the Extractor process 150-2. In other words, the Extractor process 150-2 represents one or more portions or runtime instances of the Extractor application 150-1 (or the entire application 150-1) performing or executing within or upon the processor 113 in the computerized device 110 at runtime.

The Extractor application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Extractor application 150-1 can be executed on a remotely accessible computerized device via the communication interface 115.

FIG. 17 through FIG. 20 illustrate various embodiment of the Extractor 150. The rectangular elements in flowcharts 1400, 1500, 1600, 1700 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 1400, 1500, 1600, 1700 do not necessarily depict the syntax of any particular programming language. Rather, flowcharts 1400, 1500, 1600, 1700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 17:
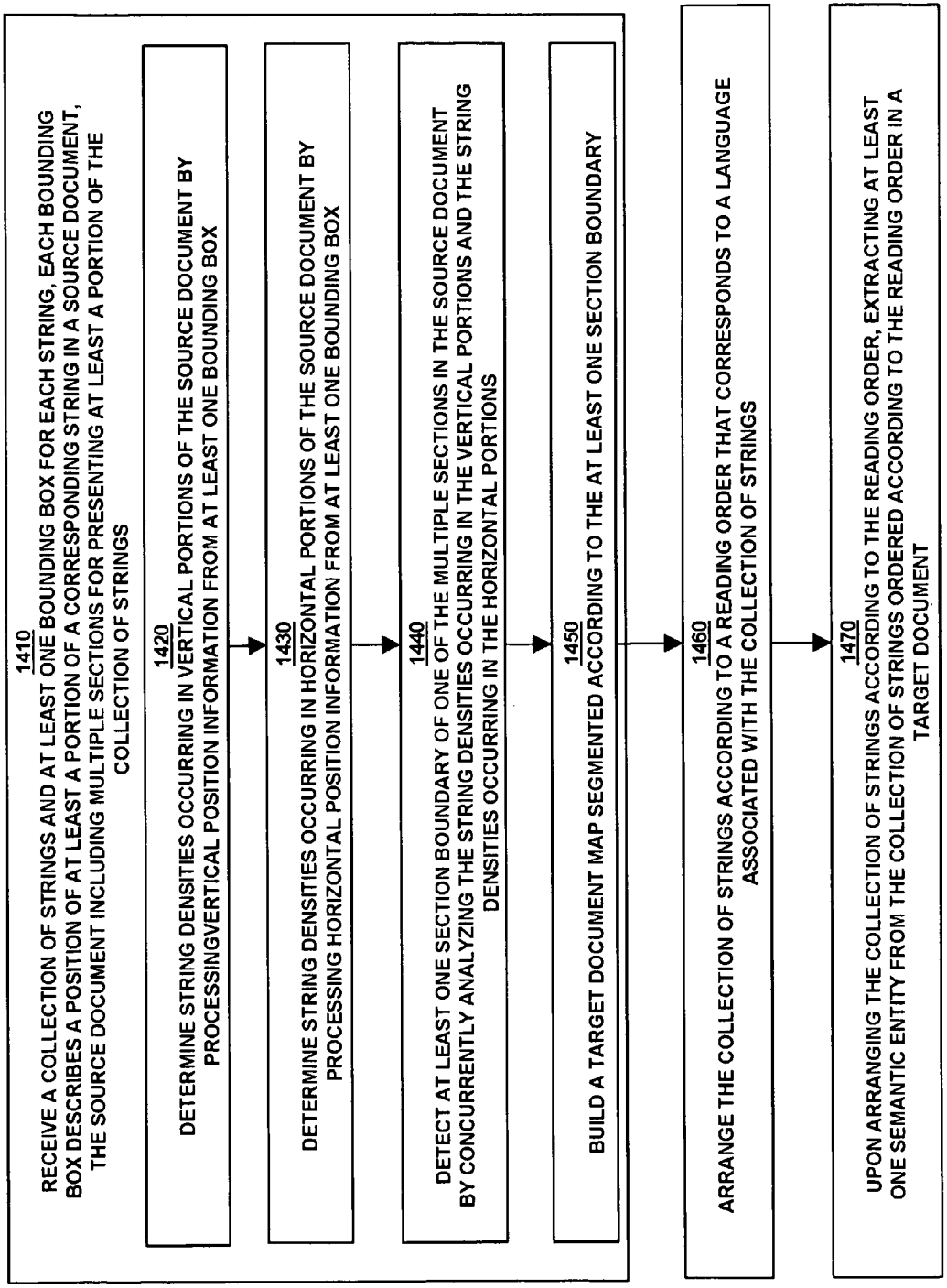
FIG. 17 is a flowchart of an example of processing steps performed by the Extractor to extract semantic entities from a target document according to embodiments herein.

FIG. 17 is a flowchart 1400 of an example of processing steps performed by the Extractor 150 to extract semantic entities from a target document according to embodiments herein.

At step 1410, the Extractor 150 receives a collection of strings and a bounding box for each string. Each bounding box describes a position of at least a portion of a corresponding string in a source document, which includes multiple sections for presenting portions of the collection of strings At step 1420, the Extractor 150 determines string densities occurring in vertical portions of the source document by processing vertical position information from the bounding boxes.

At step 1430, the Extractor 150 determines string densities occurring in horizontal portions of the source document by processing horizontal position information from the bounding boxes.

At step 1440, the Extractor 150 detects the section boundaries of the multiple sections in the source document by concurrently analyzing the string densities occurring in the vertical portions and the string densities occurring in the horizontal portions.

At step 1450, the Extractor 150 builds a target document map segmented according to the section boundaries.

At step 1460, the Extractor 150 arranges the collection of strings according to a reading order that corresponds to a language associated with the collection of strings.

At step 1470, upon arranging the collection of strings according to the reading order, the Extractor 150 extracts semantic entities from the collection of strings ordered according to the reading order in a target document.

Figure 18:
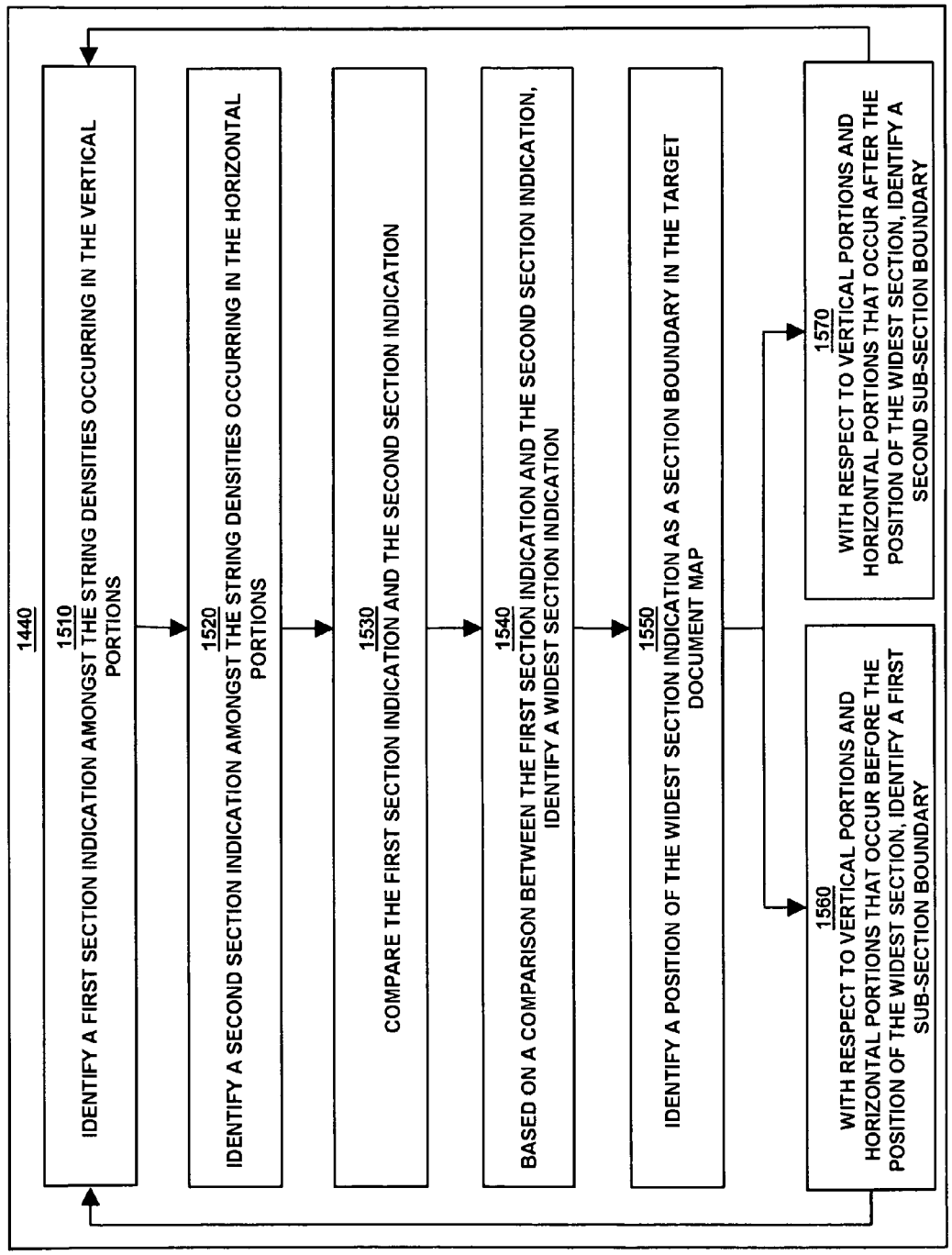
FIG. 18 is a flowchart of an example of processing steps performed by the Extractor to identify section indications and sub-section indications amongst string densities occurring in vertical and horizontal portions of a source document according to embodiments herein.

FIG. 18 is a flowchart 1500 of an example of processing steps performed by the Extractor to identify section indications and sub-section indications amongst string densities occurring in vertical and horizontal portions of a source document according to embodiments herein.

At step 1510, the Extractor 150 identifies a first section indication amongst the string densities occurring in the vertical portions. In order to identify the first section indication, the Extractor 150 locates a continuously straight span amongst the string densities occurring in the vertical portions that represents an absence of strings.

Upon determining the continuously straight span comprises a width that is greater than a character width associated with at least one of: (i) a string density positioned before the span and (ii) a string density positioned after the first span, the Extractor 150 identifies the continuously straight span as a candidate section boundary. To locate the continuously straight span, the Extractor 150 defines a threshold that describes an allowable amount of string density in the continuously straight span and determines that the actual amount of string density occurring in the continuously straight span is no more than the threshold.

However, upon determining the continuously straight span comprises a width that is less than the character width associated with at least one of: (i) the string density positioned before the first span and (ii) the string density positioned after the first span, the Extractor 150 identifies the continuously straight span as an invalid span.

At step 1520, the Extractor 150 identifies a second section indication amongst the string densities occurring in the horizontal portions by locating a continuously straight span amongst the string densities occurring in the horizontal portions that represents an absence of strings.

Upon determining that that continuously straight span comprises a height that is greater than a character height associated with at least one of: (i) a string density positioned before the continuously straight span and (ii) a string density positioned after the continuously straight span, the Extractor 150 identifies the continuously straight span as a candidate section boundary. To locate the continuously straight span, the Extractor 150 defines a threshold that describes an allowable amount of string density in the continuously straight span and determines that the actual amount of string density occurring in the continuously straight span is no more than the threshold.

However, upon determining that the continuously straight span comprises a height that is less than the character height associated with at least one of: (i) the string density positioned before the second continuously straight span and (ii) the string density positioned after the second continuously straight span, the Extractor 150 identifies the continuously straight span as an invalid span.

At step 1530, the Extractor 150 compares the first section indication and the second section indication.

At step 1540, based on a comparison between the first section indication and the second section indication, the Extractor 150 identifies a widest section indication.

At step 1550, the Extractor 150 identifies the position of the widest section indication as a section boundary in the target document map.

At step 1560, with respect to vertical portions and horizontal portions that occur before the position of the widest section, the Extractor 150 repeats steps 1440 and 1510 in order to identify a first sub-section boundary.

At step 1570, with respect to vertical portions and horizontal portions that occur after the position of the widest section, the Extractor 150 repeats steps 1440 and 1510 in order to identify a second sub-section boundary.

Figure 19:
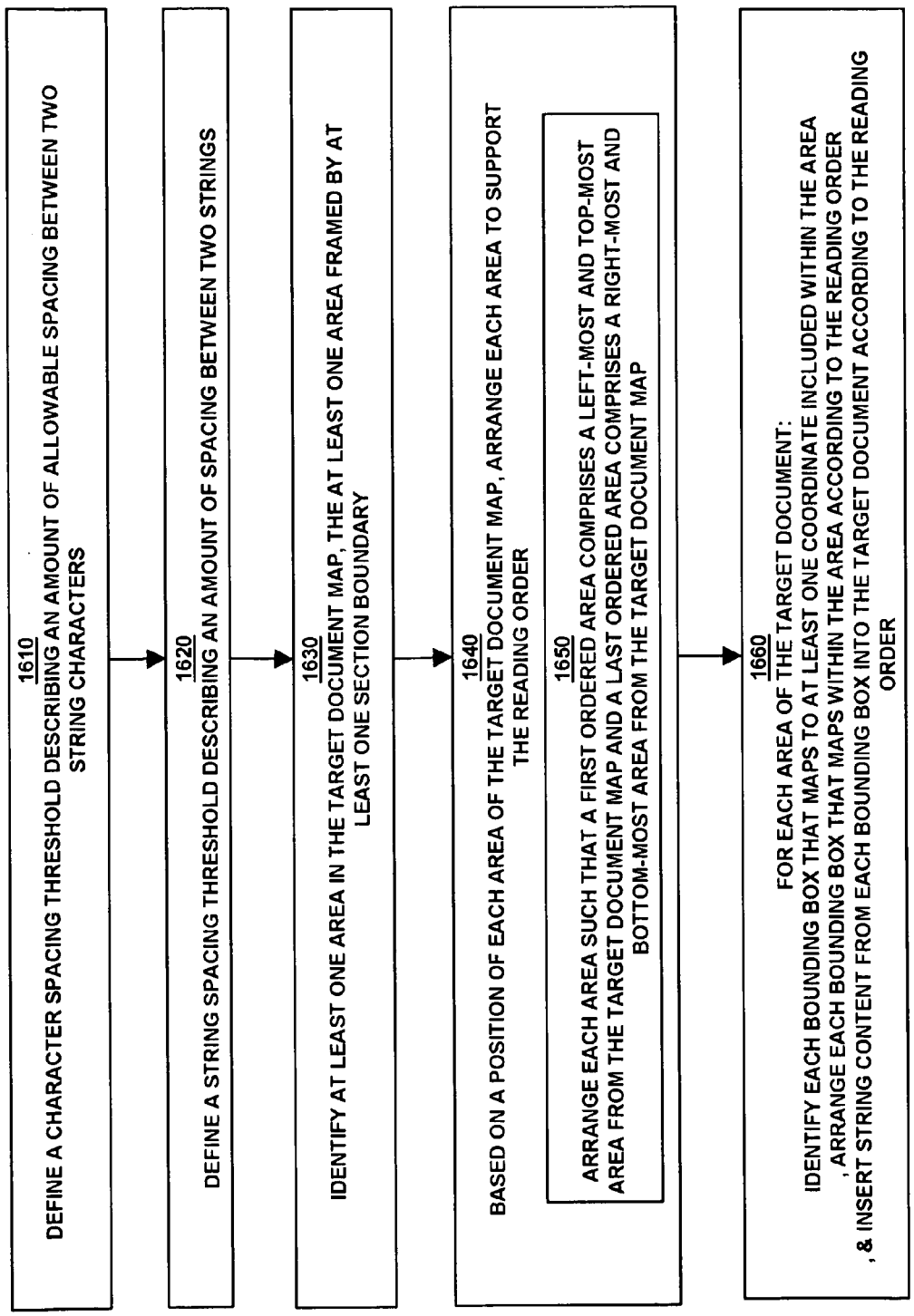
FIG. 19 is a flowchart of an example of processing steps performed by the Extractor to arrange areas within target document map according to a reading order according to embodiments herein.

FIG. 19 is a flowchart 1600 of an example of processing steps performed by the Extractor to arrange areas within target document map according to a reading order according to embodiments herein.

At step 1610, the Extractor 150 defines a character spacing threshold describing an amount of allowable spacing between two string characters.

At step 1620, the Extractor 150 defines a string spacing threshold describing an amount of spacing between two strings.

At step 1630, the Extractor 150 identifies areas in the target document map that are framed section boundaries.

At step 1640, based on a position of each area of the target document map, the Extractor 150 arranges each area to support the reading order.

At step 1650, the Extractor 150 arranges each area such that a first ordered area comprises a left-most and top-most area from the target document map and a last ordered area comprises a right-most and bottom-most area from the target document map.

At step 1660, for each area of the target document, the Extractor 150 identifies each bounding box that maps to an the area. Upon identifying the bounding box, the Extractor 150 identifies a previous bounding box with respect to the position of the identified bounding box. If a spacing between the identified bounding box and the previous bounding box is within the character spacing threshold, the Extractor 150 combines the identified bounding box and the previous bounding box to form a complete string (i.e. a single string).

If the spacing between the identified bounding box and the previous bounding box is at least equal to the string spacing threshold, the Extractor 150 includes a space between the identified bounding box and the previous bounding box.

The Extractor 150 arranges each bounding box that maps within the area according to the reading order. To do so, the Extractor 150 determines a first bounding box as a bounding box positioned at a left-most and top-most coordinate within the area and a last bounding box as a bounding box positioned at a right-most and left-most coordinate with the area. The Extractor 150 similarly arranges all other bounding boxes according to the reading order between the first bounding box and last bounding box. The Extractor 150 then inserts string content from each string associated with the bounding box into the target document according to the reading order.

FIG. 20 is a flowchart 1700 of an example of processing steps performed by the Extractor to create an output file with semantic entities and tags for each semantic entity according to embodiments herein.

At step 1710, the Extractor 150 utilizes a document tree that includes nodes corresponding to logical sections of the target document. The nodes each store an extraction rule describing semantic entities to be extracted from the target document and placed at a position within a data structure. Each position in the data structure is associated with a node in the document tree.

At step 1720, the Extractor 150 scans the target document to identify a string in the target document that corresponds to a semantic entity described by an extraction rule at one of the nodes.

At step 1730, upon identifying the string that corresponds to the semantic entity, the Extractor 150 inserts the identified string into the position in the data structure.

At step 1740, the Extractor 150 collects each semantic entity stored in the data structure.

At step 1750, for each collected semantic entity, the Extractor 150 associates a tag to a collected semantic entity (See step 1760) The tag describes a category of content, for the collected semantic entity, specific to a logical section of the target document that includes the collected semantic entity.

At step 1770, the Extractor 150 creates an output file that includes each collected semantic entity and each tag.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   receiving a collection of strings, each string from the collection of strings having a corresponding bounding box describing a position of at least a portion of the string in a source document, the source document including multiple sections, each section presenting at least a portion of the collection of strings;
   determining string densities occurring in a first subset of vertical portions of the source document by processing vertical position information from at least one bounding box by scanning left to right;
   determining string densities occurring in a first subset of horizontal portions of the source document by processing horizontal position information from at least one bounding box by scanning top to bottom;
   detecting a section boundary of one of the multiple sections in the source document by concurrently analyzing the string densities occurring in vertical portions and the string densities occurring in horizontal portions;
   based on the section boundary, assigning each string from the collection of strings to either a pre-boundary collection of strings, or a post-boundary collection of strings;
   recursively analyzing the pre-boundary collection of strings and the post-boundary collection of strings to search for additional section boundaries in each collection; and
   arranging the collection of strings according to a reading order using the section boundary, the reading order corresponding to a language associated with the collection of strings.

2. The method as in claim 1, wherein detecting the section boundary further comprises using both the string densities occurring in the vertical portions and the string densities occurring in the horizontal portions; and wherein the method further comprises building a target document map segmented according to the section boundary.

3. The method as in claim 2, wherein detecting the section boundary comprises:
   identifying a first section indication amongst the string densities occurring in the vertical portions;
   identifying a second section indication amongst the string densities occurring in the horizontal portions;
   comparing the first section indication and the second section indication;
   based on a comparison between the first section indication and the second section indication, identifying a widest section indication; and
   identifying a position of the widest section indication as the section boundary in the target document map.

4. The method as in claim 3 wherein recursively analyzing the pre-boundary collection of strings comprises:
   determining subsection string densities occurring in a second set of vertical portions of the source document before the section boundary by processing vertical position information from at least one bounding box by scanning left to right;
   determining subsection string densities occurring in a second set of horizontal portions of the source document before the section boundary by processing horizontal position information from the at least one bounding box by scanning top to bottom;
   detecting a second section boundary in the source document using the subsection string densities occurring in vertical portions and the subsection string densities occurring in horizontal portions.

5. The method as in claim 3, wherein identifying the first section indication amongst the string densities occurring in the vertical portions includes:
   locating a first continuously straight span amongst the string densities occurring in the vertical portions that represents an absence of strings;
   upon determining the first continuously straight span comprises a width greater than a character width associated with at least one of: (i) a string density positioned before the first span and (ii) a string density positioned after the first span, identifying the first continuously straight span as a candidate section boundary; and
   upon determining the first continuously straight span comprises a width less than the character width associated with at least one of: (i) the string density positioned before the first span and (ii) the string density positioned after the first span, identifying the first continuously straight span as an invalid span.

6. The method as in claim 5, wherein locating the first continuously straight span amongst the string densities occurring in the vertical portions includes:
   defining a first threshold describing an allowable amount of string density in the first continuously straight span; and
   determining an amount of string density occurring in the first continuously straight span is no more than the first threshold.

7. The method as in claim 3, wherein identifying the second section indication amongst the string densities occurring in the horizontal portions includes:
   locating a second continuously straight span amongst the string densities occurring in the horizontal portions that represents an absence of strings;
   upon determining the second continuously straight span comprises a height greater than a character height associated with at least one of: (i) a string density positioned before the second continuously straight span and (ii) a string density positioned after the second continuously straight span, identifying the second continuously straight span as a candidate section boundary; and
   upon determining the second continuously straight span comprises a height less than the character height associated with at least one of: (i) the string density positioned before the second continuously straight span and (ii) the string density positioned after the second continuously straight span, identifying the second continuously straight span as an invalid span.

8. The method as in claim 7, wherein locating the second continuously straight span amongst the string densities occurring in the horizontal portions includes:
   defining a second threshold describing an allowable amount of string density in the second continuously straight span; and
   determining an amount of string density occurring in the second continuously straight span is no more than the second threshold.

9. The method as in claim 1, comprising:
   detecting at least one indication of a vertical section in the source document among the string densities occurring in the vertical portions, the at least one indication of the vertical section in the source document comprising a width greater than a character width of at least one string proximate to the at least one indication of the vertical section; and
   detecting at least one indication of a horizontal section in the source document among the string densities occurring in the horizontal portions, the at least one indication of the horizontal section in the source document comprising a height greater than a character height of at least one string proximate to the at least one indication of the horizontal section.

10. A non-transitory computer readable medium comprising executable instructions encoded thereon operable on a computerized device to perform processing comprising:
   instructions for receiving a collection of strings, each string from the collection of strings having a corresponding bounding box describing a position of at least a portion of the string in a source document, the source document including multiple sections, each section for presenting at least a portion of the collection of strings;
   instructions for determining string densities occurring in a first subset of vertical portions of the source document by processing vertical position information from at least one bounding box;
   instructions for determining string densities occurring in a first subset of horizontal portions of the source document by processing horizontal position information from at least one bounding box;
   instructions for detecting a section boundary of one of the multiple sections in the source document by concurrently analyzing the string densities occurring in the vertical portions and the string densities occurring in the horizontal portions;
   instructions for assigning, based on the section boundary, each string from the collection of string to either a pre-boundary collection of string, or a post-boundary collection of strings;
   instructions for recursively analyzing the pre-boundary collection of strings and the post-boundary collection of strings; and instructions for building a target document map segmented according to the section boundary.

11. The non-transitory computer readable medium in claim 10, wherein the instructions for detecting the section boundary of one of the multiple sections in the source document by concurrently analyzing the string densities occurring in the vertical portions and the string densities occurring in the horizontal portions include:
   instructions for identifying a first section indication amongst the string densities occurring in the vertical portions;
   instructions for identifying a second section indication amongst the string densities occurring in the horizontal portions;
   instructions for comparing the first section indication and the second section indication;
   instructions for identifying a widest section indication based on a comparison between the first section indication and the second section indication; and
   instructions for identifying a position of the widest section indication as a section boundary in the target document map.

12. The non-transitory computer readable medium as in claim 11, comprising:
   with respect to vertical portions and horizontal portions that occur before the position of the widest section, repeating the instructions for detecting the at least one section boundary of one of the multiple sections in the source document by concurrently analyzing the string densities occurring in the vertical portions and the string densities occurring in the horizontal portions in order to identify a first sub-section boundary; and
   with respect to vertical portions and horizontal portions that occur after the position of the widest section, repeating the instructions for detecting the at least one section boundary of one of the multiple sections in the source document by concurrently analyzing the string densities occurring in the vertical portions and the string densities occurring in the horizontal portions in order to identify a second sub-section boundary.

13. The non-transitory readable medium as in claim 11, wherein instructions for identifying the first section indication amongst the string densities occurring in the vertical portions include:
   instructions for locating a first continuously straight span amongst the string densities occurring in the vertical portions that represents an absence of strings;
   instructions for identifying the first continuously straight span as a candidate section boundary upon determining the first continuously straight span comprises a width greater than a character width associated with at least one of: (i) a string density positioned before the first span and (ii) a string density positioned after the first span; and
   instructions for identifying the first continuously straight span as an invalid span upon determining the first continuously straight span comprises a width less than the character width associated with at least one of: (i) the string density positioned before the first span and (ii) the string density positioned after the first span.

14. The non-transitory readable medium as in claim 13, wherein the instructions for locating the first continuously straight span amongst the string densities occurring in the vertical portions include:
   instructions for defining a first threshold describing an allowable amount of string density in the first continuously straight span; and
   instructions for determining an amount of string density occurring in the first continuously straight span is no more than the first threshold.

15. The non-transitory readable medium as in claim 11, wherein instructions for identifying the second section indication amongst the string densities occurring in the horizontal portions include:
   instructions for locating a second continuously straight span amongst the string densities occurring in the horizontal portions that represents an absence of strings;
   instructions for identifying the second continuously straight span as a candidate section boundary upon determining the second continuously straight span comprises a height greater than a character height associated with at least one of: (i) a string density positioned before the second continuously straight span and (ii) a string density positioned after the second continuously straight span; and
   instructions for identifying the second continuously straight span as an invalid span upon determining the second continuously straight span comprises a height less than the character height associated with at least one of: (i) the string density positioned before the second continuously straight span and (ii) the string density positioned after the second continuously straight span.

16. The non-transitory readable medium as in claim 15, wherein the instructions for locating the second continuously straight span amongst the string densities occurring in the horizontal portions include:
   instructions for defining a second threshold describing an allowable amount of string density in the second continuously straight span; and
   instructions for determining an amount of string density occurring in the second continuously straight span is no more than the second threshold.

17. A computer system comprising:
   a processor;
   a memory unit that stores instructions associated with an application executed by the processor; and
   an interconnect coupling the processor and the memory unit, enabling the computer system to execute the application and perform operations of:
      receiving a collection of strings, each string from the collection of strings having a corresponding bounding box describing a position of at least a portion of the string in a source document, the source document including multiple sections, each section for presenting at least a portion of the collection of strings;
      determining string densities occurring in a first subset of vertical portions of the source document by processing vertical position information from at least one bounding box by scanning left to right;
      determining string densities occurring in a first subset of horizontal portions of the source document by processing horizontal position information from at least one bounding box by scanning top to bottom;
      detecting a section boundary of one of the multiple sections in the source document by concurrently analyzing the string densities occurring in vertical portions and the string densities occurring in horizontal portions;
      assigning, based on the section boundary, each string from the collection of string to either a pre-boundary collection of string, or a post-boundary collection of strings;

recursively analyzing the pre-boundary collection of strings and the post-boundary collection of strings; and arranging the collection of strings according to a reading order, the reading order corresponding to a language associated with the collection of strings.

* * * * *